United States Patent
Hazy

(10) Patent No.: US 8,693,377 B1
(45) Date of Patent: Apr. 8, 2014

(54) USER DRIVEN VOICE INTERACTION

(76) Inventor: Robert Joseph Hazy, El Dorado Hills, CA (US)

(*) Notice: Subject to any disclaimer, the term of this patent is extended or adjusted under 35 U.S.C. 154(b) by 502 days.

(21) Appl. No.: 13/028,232

(22) Filed: Feb. 16, 2011

Related U.S. Application Data

(63) Continuation-in-part of application No. 12/958,424, filed on Dec. 2, 2010, now Pat. No. 8,468,210, which is a continuation of application No. 10/377,444, filed on Mar. 3, 2003, now Pat. No. 7,895,283.

(60) Provisional application No. 60/363,506, filed on Mar. 8, 2002.

(51) Int. Cl.
*H04L 12/16* (2006.01)

(52) U.S. Cl.
USPC ........ 370/270; 370/352; 370/493; 379/88.01; 379/88.13; 379/88.16; 379/88.22; 455/413; 709/204

(58) Field of Classification Search
None
See application file for complete search history.

(56) References Cited

U.S. PATENT DOCUMENTS

| | | | |
|---|---|---|---|
| 6,304,573 B1 | 10/2001 | Hicks, III | |
| 6,757,362 B1 * | 6/2004 | Cooper et al. | 379/88.01 |
| 6,876,729 B1 * | 4/2005 | Kuter et al. | 379/88.22 |
| 2002/0098831 A1 * | 7/2002 | Castell et al. | 455/413 |
| 2003/0078033 A1 * | 4/2003 | Sauer et al. | 455/412 |
| 2005/0163289 A1 | 7/2005 | Caspi et al. | |
| 2006/0046757 A1 | 3/2006 | Hoover et al. | |
| 2008/0089489 A1 | 4/2008 | Katkam et al. | |

* cited by examiner

*Primary Examiner* — Chi Pham
*Assistant Examiner* — Shick Hom
(74) *Attorney, Agent, or Firm* — Ash Tankha; Lipton, Weinberger & Husick

(57) ABSTRACT

A computer implemented method and system is provided for exchanging voice messages between a sender and a recipient. A client component that allows the sender to create, address, and render the voice messages to the recipient using a graphical user interface is provided. A messaging server that enables interaction between the sender and the recipient is also provided. The sender records one or more voice messages and addresses the recorded voice messages on the client component by entering a recipient address or an arbitrary address. The client component transmits the recorded voice messages, the recipient address or the arbitrary address, and a client identifier to the messaging server. The messaging server resolves a recipient delivery address based on the arbitrary address. The messaging server transmits a delivery message comprising the recorded voice messages to the resolved recipient delivery address. The recipient responds to the recorded voice messages with response messages.

20 Claims, 21 Drawing Sheets

USER DRIVEN VOICE INTERACTION

CROSS REFERENCE TO RELATED APPLICATIONS

This application is a continuation-in-part application of patent application Ser. No. 12/958,424 titled "Audio Message Driven Customer Interaction Queuing System" filed on Dec. 2, 2010 now U.S. Pat. No. 8,468,210, which is a continuation of non-provisional patent application Ser. No. 10/377,444 titled "Audio Message Driven Customer Interaction Queuing System" filed on Mar. 3, 2003 in the United States Patent and Trademark Office, which claims the benefit of provisional patent application No. 60/363,506 titled "Voice Message Driven Customer Interaction Queuing System" filed on Mar. 8, 2002 in the United States Patent and Trademark Office.

BACKGROUND

The computer implemented method and system disclosed herein, in general, relates to customer relationship management (CRM) contact channel applications. More particularly, the computer implemented method and system disclosed herein relates to an audio message driven customer interaction queuing system (AMDCIQS).

It can be appreciated that CRM contact channel applications have been in use for years, and have become a natural melting pot for traditional telephony customer interaction and newly emerging web contact paradigms such as electronic mail (email), voice over internet protocol (VoIP), web call-back requests, and text chatting. Of these, voice applications are of particular interest, but the other channels offer insight into the customer service equation as their service characteristics become germane to the method and system disclosed herein.

One problem with conventional CRM contact channel applications is that the service model for voice interaction is unsatisfactory even though voice interaction remains the channel preferred by customers and is still the most effective and proven channel for sales and support. Existing web-oriented customer service involves a compendium of textual and visual self-help material designed to deflect extraneous call traffic from call centers. When customers actually desire interaction on the web, their options include, for example, sending an email to a vendor, asking for an immediate call back from the vendor, text chatting with customer support agents, or opening a VoIP voice session with an agent. The weaknesses of each of these methods are enumerated below.

Email contact into CRM contact channel applications is managed on the user side through web-forms and/or email programs designed to help customers isolate issues for discussion, and frequently targets groups within the vendor using the "To:" address to aid in a triage of incoming service requests. In the vendor system, an email response management system (ERMS) aggregates the incoming email traffic, performs routing analysis over the email, and routes them to service queues. In a contact center, managers devise staffing models to address this traffic in addition to the more prevalent voice traffic that besets a typical contact center. Service level agreements (SLAs) for email contacts vary widely, from as little as a few minutes for an automatically generated "receipt" response, to days or weeks. On average, the response cycle exceeds 24 hours. The net effect of this has been to damage the customer's expectation for timely service on this channel best characterized as a text message driven system.

Web call back is a second common form of customer interaction on websites and involves the voice medium. However, the drawbacks of this approach are threefold. The customer needs to wait for a call back, which can take a variable amount of time. The customer frequently receives no notification of expected wait time, further undermining the expectation for timely or "worthwhile" service. Another drawback of this approach is that the staffing model required to support web call back is similar to an out-dialing telemarketing application. As such, because the calls are real time and have indeterminate length, the model for staffing a center to handle such calls is expensive. Add to that the expense of traditional call center infrastructure, and the attractiveness of this contact channel diminishes.

Text-chatting customer interaction shares some of the same weaknesses as web call back from a staffing perspective. The primary weakness of this approach is that the staffing model required to support text chat is similar to an out-dial telemarketing application. As such, because the conversations are real time and have indeterminate length, the model for staffing a center to handle such chat sessions is expensive. Another problem with text chat is that it requires text entry for users, which is a frequent barrier to usage. A third problem is the customer must wait in a queue before receiving service, further diminishing the customer's excitement impulse to establish contact.

Voice over internet protocol (VoIP) is another form of current customer interaction over the web and shares the queuing weaknesses of the approaches above as well as their expensive staffing models, since VoIP is connection-oriented in the sense that VoIP requires a real-time synchronous connection between two users. This means that users on either end of the synchronous connection must participate at the same time, unlike a messaging application. Additionally, VoIP infrastructure is expensive to acquire and manage. Furthermore, the quality of VoIP remains a problem for many users. Even with the quick saturation of broadband services into the consumer market, underlying limitations of shared internet communications without quality of service (QoS) guarantees makes VoIP somewhat unreliable. For these reasons, the adoption curve for VoIP has been slow, even though VoIP will ultimately be a useful contact channel. QoS issues aside, VoIP always necessitates an expensive staffing model and infrastructure to support. Regardless of network performance improvements, all connection-oriented service technologies require customers to "queue" before asking their questions.

Regarding another channel, there has been a recent application of instant messaging technology for CRM, for example, in the form of Twitter® operated by Twitter Inc., and other social networking services. Instant messaging allows users to send text to one another, and sometimes permits audio messaging. What has not happened, though, is the application of this mode of interaction for N to one (N:1) customer service for voice.

While these contact channel applications may be suitable for the particular purpose to which they address, they are not as suitable for voice-enabled web customer service. The net result of the above discussion is a pastiche of customer dissatisfaction and customer service organization frustration.

On the customer side, the interaction is marked by inconvenience, waiting, unnatural interaction paradigms employing text input and general technical obstacles. The result is diminished excitement on the part of customer, reduced patience with inhumane technology solutions that solve nothing, drive frustration, and ultimately, undermine the transaction itself.

On the customer service organization side, center managers are frustrated at mounting expenses from increasing staffing models, new infrastructure costs that deliver underwhelming performance, and burnt out customer service agents. The net result of the overload and expense pressure is a retreat from solving the problem.

Hence, there is a long felt but unresolved need for a voice message driven customer interaction queuing system, which substantially departs from the conventional concepts, and in so doing provides a method and system developed for providing voice-enabled web pages and local messaging client components in a general customer-driven messaging context as well as a retail or customer support context for allowing customers and web page visitors to utter questions into a local client component or a browser-resident recorder application akin to a walkie-talkie.

Furthermore, conventional exchange of voice messages between a sender such as a customer, and a recipient such as an enterprise or an agent, requires the customer to disclose their identity to the enterprise potentially making the customer's identity available to the enterprise for unfavorable usage or usage not contemplated by the customer. Moreover, in a conventional customer service scenario, customers voice their opinion via an electronic commerce (e-commerce) web page associated with the enterprise. The enterprise drives the interaction between the customer and the enterprise by inviting the customer for a discussion. The customer cannot voice their thoughts towards an enterprise unless the enterprise invites the customer to voice the customer's thoughts towards the enterprise. There is a need to enable and empower customers to voice their thoughts towards any entity whether that entity is prepared for it or not, and without requiring the customer to find the address of the target entity. Therefore, there is a need for a computer implemented method and system that allows the interaction between the customer and the enterprise to be driven primarily by the customer.

Hence, there is a long felt but unresolved need for a computer implemented method and system that enables customer driven exchange of voice messages between a customer and arbitrary targets. There is also a need for a messaging server that delivers the voice messages by performing address resolution of arbitrary addresses into valid enterprise addresses.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for customer driven exchange of voice messages between a customer and arbitrary targets. The computer implemented method and system disclosed herein also delivers the voice messages by performing address resolution of arbitrary addresses into to valid enterprise addresses.

In accordance with the computer implemented method and system disclosed herein, an audio message driven customer interaction queuing system generally comprises a client component, a messaging server, and recipient components designed to allow senders to spontaneously create or utter and issue messages with questions into a browser-resident voice recorder application, or a local client software component akin to a walkie-talkie without queuing beforehand. These messages are then queued along with originating web page information and user data and distributed to recipients, for example, service agents. Such submissions may or may not be anonymous to protect the identity of the sender who submits the voice message. The recipients can then conduct research on the questions, for example, using the originating web page as a reference, and respond with a voice message, a short message service (SMS) message, a multimedia messaging service (MMS) message, etc., played upon the recorder application or the client component after a brief service interval. More generally, the computer implemented method and system disclosed herein implements message types, for example, audio, that is, primarily voice, video, text, electronic mail (email), SMS messages, MMS messages, fax, etc. There are additional features of the computer implemented method and system disclosed herein that will be described hereinafter.

It is to be understood that the computer implemented method and system disclosed herein is not limited in its application to the details of construction and to the arrangements of the components set forth in the following description or illustrated in the drawings. The computer implemented method and system disclosed herein is capable of other embodiments and of being practiced and carried out in different ways. Also, it is to be understood that the phraseology and terminology employed herein are for the purpose of the description and should not be regarded as limiting.

The computer implemented method and system disclosed herein further addresses the need for exchanging voice messages between a sender and a recipient. As used herein, the term "sender" refers to a user, a customer, a consumer, or other entity who wishes to utter a question or send a message to a recipient, for example, a service agent. Also, as used herein, the term "recipient" refers to, for example, a customer service facility, an enterprise, or other service entity that addresses queries, receives customer feedback, provides customer support, etc. The computer implemented method and system disclosed herein provides a client component to the sender and the recipient. The client component is, for example, a standalone application provided on a computing device of the sender and the recipient, or a browser based application provided on a web hosting service. The computer implemented method and system disclosed herein also provides a messaging server that enables interaction between the sender and the recipient for exchanging the voice messages.

The client component renders a graphical user interface that allows the sender to create, address, and render the voice messages to the recipient. The client component is made available for download through a web hosting service of the messaging server. In an embodiment, the client component is downloaded and installed on a computing device, for example, a mobile phone, a personal digital assistant, a tablet computer, a personal computer, a laptop, etc., of the sender. In another embodiment, the sender accesses the client component via a communication network. The sender can access the client component installed on the sender's computing device, utilize the browser based application on the web hosting service, or access the client component via the communication network to render one or more voice messages to the recipient.

The sender records one or more voice messages on the client component. The sender addresses each of the recorded voice messages on the client component via the graphical user interface by entering a recipient address or an arbitrary address on the client component. As used herein, the term "recipient address" refers to an actual address of the recipient known to the sender. Also, as used herein, the term "arbitrary address" refers to a non-specific or indefinite address or string associated with the recipient that is provided by the sender, if the actual address of the recipient is not known to the sender. In an embodiment, the sender registers with the messaging server for maintaining an account for sending the recorded voice messages to the recipient and for receiving response messages from the recipient. The recipient may also register an address with the messaging server for subsequent message exchanges.

The client component transmits the recorded voice messages, the recipient address or the arbitrary address, and a client identifier associated with the client component to the messaging server via the communication network. The recorded voice messages are anonymously transmitted to the recipient via the messaging server. In an embodiment, the recorded voice messages are non-anonymously transmitted to the recipient via the messaging server. In an embodiment, the messaging server stores the recorded voice messages on the messaging server.

On receiving the recorded voice messages from the client component, the messaging server resolves a recipient delivery address based on the arbitrary address entered by the sender for delivering each of the recorded voice messages to the recipient. The resolved recipient delivery address is, for example, the recipient address, a predefined delivery address of the recipient, a predefined electronic mail address of the recipient, a default recipient address, and a predefined identification number such as a mobile phone number of the recipient. The messaging server resolves the recipient delivery address, for example, by matching the arbitrary address with the predefined delivery address of the recipient, by matching the arbitrary address with the predefined electronic mail address or the predefined identification number such as a mobile phone number of the recipient, or by matching the arbitrary address with the default recipient address.

The messaging server transmits a delivery message comprising one or more of the recorded voice messages to the resolved recipient delivery address. The delivery message further comprises a web address, optional explanatory text, and a session identifier. The transmission of the delivery message by the messaging server comprises, for example, delivering the recorded voice messages as one or more audio file attachments to the resolved recipient delivery address, or delivering a web address and a session identifier associated with the recorded voice messages to the resolved recipient delivery address. The web address provides a link to the messaging server for downloading the client component and retrieving the recorded voice messages. The session identifier allows continuity of the exchange of the voice messages between the sender and the recipient by routing the response messages of the recipient to the sender. The messaging server sends a notification to the client component accessed via the computing device of the sender on transmitting the recorded voice messages to the resolved recipient delivery address.

The recipient, for example, a service agent, responds to the recorded voice messages in the delivery message with one or more response messages. The recipient may download the client component on the recipient's computing device, for example, a mobile phone, a personal digital assistant, a tablet computer, a personal computer, a laptop, etc., of the recipient. In this embodiment, the recipient transmits the response messages to, for example, the electronic mail (email) address of the sender, a predefined identification number such as a mobile phone number of the sender, the client component of the sender via the messaging server, etc., using the client component on the recipient's computing device. The client component is also made available for download through a web hosting service of the messaging server. The recipient can access the client component installed on the recipient's computing device, utilize the browser based application on the web hosting service, or access the client component via the communication network to transmit the response messages. In an embodiment, the recipient transmits the response messages directly to the sender, for example, via email, SMS, etc.

The computer implemented method and system disclosed herein provides an audio message driven customer interaction queuing system with multiple advantages listed below:

The client component operates without the need to queue with a customer service and wait for a recipient before satisfying the sender's desire to ask a question. This results in the following advantages:

(a) Senders can immediately record messages of different media types at the moment of conception.
(b) Senders can issue messages spontaneously into a customer service organization without waiting for recipients, for example, service agents, to become available first.
(c) Disruption is minimized to user routine.
(d) Impulse contact is enabled.
(e) Contact model is simplified for the sender and the recipient.
(f) Senders may submit messages anonymously to reduce hassle and maintain personal space, both of which otherwise discourage contact.
(g) Senders may issue messages to arbitrary targets at their pleasure, versus searching for contact addresses and enduring the contact terms of the addressee.

Moreover, the client component is not connection-oriented and relies on messages as a medium of exchange versus persistent real-time telecom sessions or connections. The connectionless feature leads to multiple advantages in, for example, a customer service center hosting the client component as listed below:

(a) Load balancing for service requests.
(b) Reduced staffing requirements in the service center.
(c) Audio fidelity improvement of messages versus VoIP.
(d) Elimination or avoidance of expensive infrastructure comprising, for example, VoIP switches, automated call distributors (ACDs), and private branch exchange (PBX) switches.

The computer implemented method and system disclosed herein can be implemented on voice-enabled web pages in a retail or customer support context, allowing web page visitors to utter questions into a browser-resident recorder or player application akin to a walkie-talkie. In an embodiment, the system disclosed herein can reside on any computing device, for example, personal computers, desktops, laptops, notebooks, netbooks, tablet computing devices, mobile phone platforms, etc., where the computing device employs a standalone application which functions in a similar manner to the browser based application. The computer implemented method and system disclosed herein allows senders to continue browsing a website or shopping while the recipient formulates an answer. The client component allows the sender to receive and listen to the answer on a radio-like application. This response cycle is designed to occur in less than about 2 minutes, which is usually less time than spent navigating a traditional call center phone menu. The ease of use, immediacy, instant familiarity with the device paradigm, and quick response time combine to make it easier for users to make a buying decision or to get help when they need it, thereby increasing transaction success rate.

The following business objectives succinctly list the high-level key issues addressed by the computer implemented method and system disclosed herein:

(a) Increases on-line sales effectiveness by targeting causes for transaction abandonment.
(b) Enables spontaneous customer voice contact via the web to establish sales opportunities and exploit the immediacy of the voice-oriented sales channel.
(c) Increases voice quality of web-transmitted voice such that the channel becomes acceptable to senders and recipients.
(d) Enables impulse contact from customers in order to establish sales opportunities.
(e) Reduces call center staffing expenses.
(f) Reduces infrastructure and public switched telephone network (PSTN) toll service costs.
(g) Relieves "real time" constraints placed upon customer service organizations and the expense that results.
(h) Enables spontaneous voice contact from senders to arbitrary enterprises or entities as senders see fit.

The computer implemented method and system disclosed herein allows senders to utter questions into a browser-resident recorder application or the standalone application that visually resembles and functions, for example, like a walkie-talkie. These questions are queued with originating web page information, if applicable and sender data and distributed to multiple recipients. These recipients then research the question using the supplemental data as a reference, and respond with one or more audio or voice messages. The sender plays the responses on a player on the sender's computing device or the client component.

It should be noted that this voice message driven interaction paradigm applies to non-web applications as well. Traditional telephone customer service operations could employ this message-driven model as well, employing the back-end queuing function described above to achieve similar cost economies in the customer service operation to those described here in the web context.

The computer implemented method and system disclosed herein performs the following:
(a) Provides a voice message driven customer interaction queuing system that will overcome the shortcomings of conventional systems.
(b) Provides a voice message driven customer interaction queuing system that enables voice message driven customer interaction queuing for persons desiring voice-oriented customer service on websites, or spontaneously otherwise.
(c) Provides a voice message driven customer interaction queuing system that allows website visitors to utter questions into a browser-resident recorder application akin to a walkie-talkie 2-way radio, and send these messages to a customer service for timely handling.
(d) Provides a voice message driven customer interaction queuing system that allows senders to utter questions into a standalone application on each of their computing devices, and send these messages to a customer service via a communication network for timely handling.
(e) Provides a voice message driven customer interaction queuing system that offers a method for email-style store and forward service delivery for voice messages with a brief service interval, for example, less than 1 minute message roundtrip, supported by a reduced staffing model compared to that for connection-oriented call-handling contact centers.
(f) Provides a voice message driven customer interaction queuing system that queues audio questions along with an originating web page uniform resource locator (URL) and sender data and then distributes these messages and supplemental data to recipients.
(g) Provides a voice message driven customer interaction queuing system that allows recipients to respond to questions with voice messages and route these answers back to the senders initiating contact.
(h) Provides a server-side recipient selection process for distribution of messages based upon topic of the originating URL, sender data, availability of a recipient, work load of the recipient, and immediate prior history servicing the specific sender.
(i) Leverages platform-independent development tools that facilitate cross-platform portation.
(j) Develops database management system (DBMS) independent architecture through the elimination of DBMS specific implementation features such as stored procedures and triggers.
(k) Creates an architecture easily assimilated into either information technology (IT) infrastructure of an end customer, or into the product suite architecture of a vendor in the customer relationship management (CRM) space or computer telephony integration (CTI) space.
(l) Provides continuity of service to the sender by assigning subsequent sender messages to the same recipient until the session is concluded.
(m) Provides an administrative facility for the creation, management, and deletion of recipient accounts, sender data profiles, and message management.
(n) Provides a voice message driven customer interaction queuing system that offers high voice quality by using client-side multi-media codec services for voice messages transported via the Internet.
(o) Provides a system that compresses voice into acceptably small files for transfer in an acceptably timely manner over a slow speed dialup connection, for example, at 28.8 kilobits per second (kbps).
(p) Provides a user interface that downloads to the client browser in an acceptably timely manner over even slow speed dialup connections of 28.8 kbps.
(q) Provides a user interface that immediately taps into familiar user expectations by using a "walkie-talkie-like" interface requiring minimal explanation to operate successfully.
(r) Provides a user interface with a toy-like appeal that encourages usage by leveraging user curiosity.
(s) Provides a voice message driven customer interaction queuing system that works independently of the variable quality of internet transport resulting from network latency or transport delay and jitter or variation in latency, thereby increasing voice fidelity.
(t) Eliminates upfront navigation to enterprise sites in favor of arbitrary addressing to further drive spontaneous contact.
(u) Permits senders to maintain anonymity if desired.

In an embodiment, the computer implemented method and system disclosed herein enables and empowers senders to voice their thoughts towards practically any entity whether that entity is prepared for it or not, and without necessitating to find the address of the target entity. For example, the computer implemented method and system disclosed herein enables such spontaneous or impulse behavior as allowing customers to walk up to a target store and say, "I think your prices are too high". A customer need not be invited by an entity to voice any sentiment via an electronic commerce (e-commerce) web page. Moreover, the computer implemented method and system disclosed herein generates interest from the customer by allowing the interaction between the customer and the entity to be customer driven.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

Various other objects, features and attendant advantages of the computer implemented method and system disclosed herein, will become fully appreciated as the same becomes better understood when considered in conjunction with the accompanying drawings, in which like reference characters designate the same or similar parts throughout the several views, and wherein.

DETAILED DESCRIPTION OF THE INVENTION

FIGS. 1 through 9 provide a computer implemented method and system 100 for an audio or voice message driven customer interaction queuing system comprising a client component 101, a messaging server 105, and one or more recipient components, for example, 101'. As used herein, the terms "customer", "user", and "sender" refer to a single entity that initiates the audio or voice message driven customer interaction queuing system. Herein, the term "sender" refers to a user, a customer, a consumer, or other entity that wishes to utter a question and records, addresses, and renders voice messages to a recipient, for example, a service agent. For purposes of illustration, the detailed description refers to audio or voice messages being exchanged between a sender and a recipient; however the scope of the method and system 100 disclosed herein is not limited to audio or voice messages but may be extended to include video messages, text messages, electronic mail (email), short message service (SMS) messages, multimedia messaging service (MMS) messages, etc.

Figure 1:
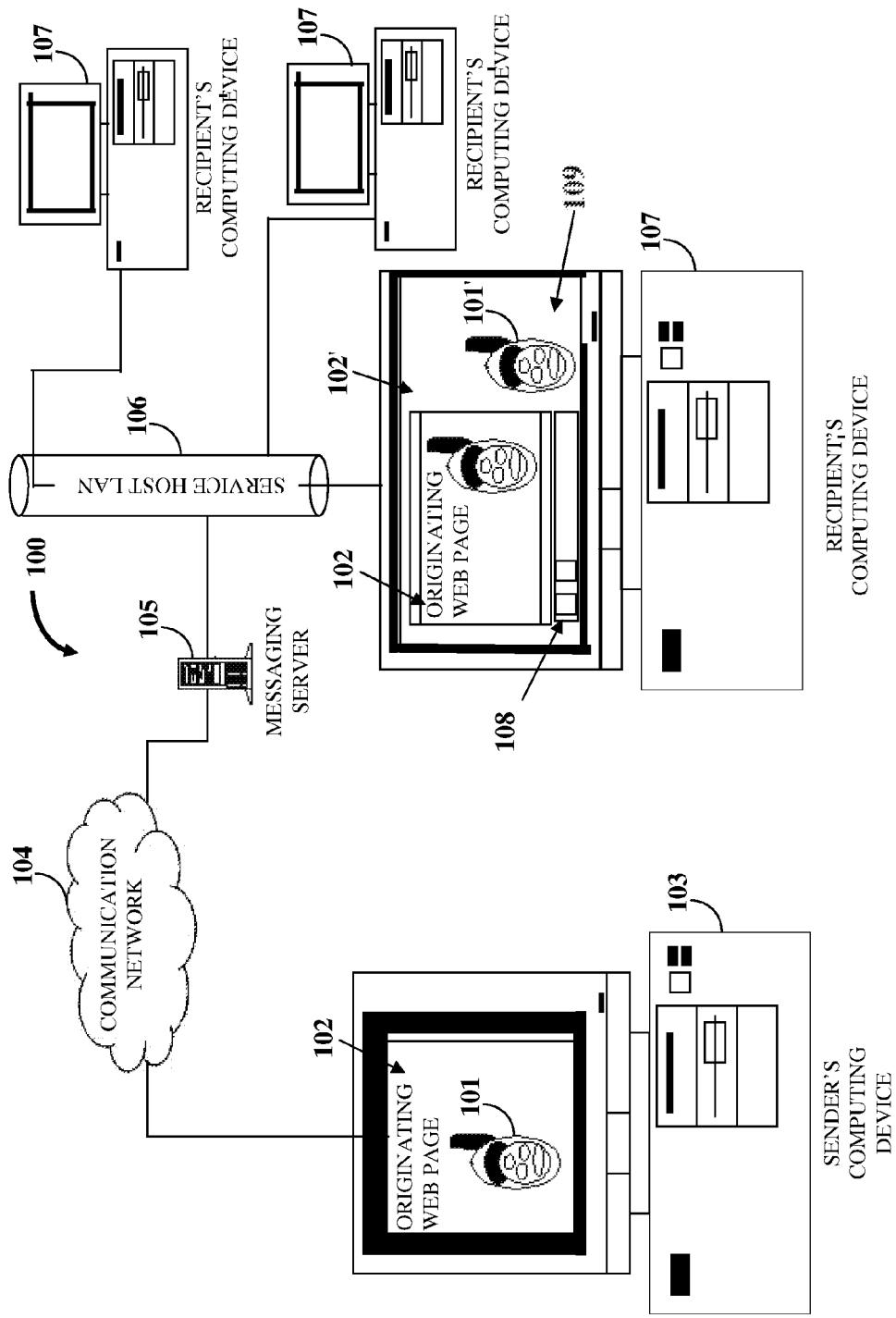
FIG. 1 exemplarily illustrates components of a system for exchange of voice messages between a sender and a recipient using a client component.

FIG. 1 exemplarily illustrates components of a system 100 for exchange of voice messages between a sender and a recipient using a client component 101, 101'. The system 100 disclosed herein comprises a client component 101, a messaging server 105, and one or more recipient components, for example, 101'. The method and system 100 disclosed herein refers to 3-party and 2-party service models. In case of a 3-party service model, the messaging server 105 brokers the interaction between senders and recipients. In case of a 2-party service model, the sender directly interacts with the recipient.

In the web-based architecture of the 3-party service model, the client component 101, 101' is hosted on a web hosting service that hosts a website. The sender accesses the website using the sender's computing device 103, for example, a mobile phone, a personal digital assistant, a tablet computer, a personal computer, a laptop, etc., and accesses the client component 101 on the website via a communication network 104. The sender creates an audio or voice message using the client component 101. The sender then transmits the message using the client component 101 to the messaging server 105 via the communication network 104. The messaging server 105 determines the availability of a recipient and selects a recipient to handle the message. The messaging server 105 distributes the message to the recipient.

The recipient accesses a web page 102' of the website on the recipient's computing device 107, for example, a mobile phone, a personal digital assistant, a tablet computer, a personal computer, a laptop, etc., and determines the web page 102 on which the sender originated the message. The recipient manages multiple concurrent sender dialogs using a connection management area 108 on the recipient's computing device 107. The recipient records response messages to the sender's questions using the client component 101' on the recipient's computing device 107 and sends the response messages back to the messaging server 105, for example, via a service host local area network (LAN) 106. The messaging server 105 sends the response messages to the sender's client component 101 for playback.

By analogy, the non-web based standalone application operates in a similar manner in the back-end, with few differences on the front end, primarily due to lack of browser origination and need for addressing.

Figure 2:
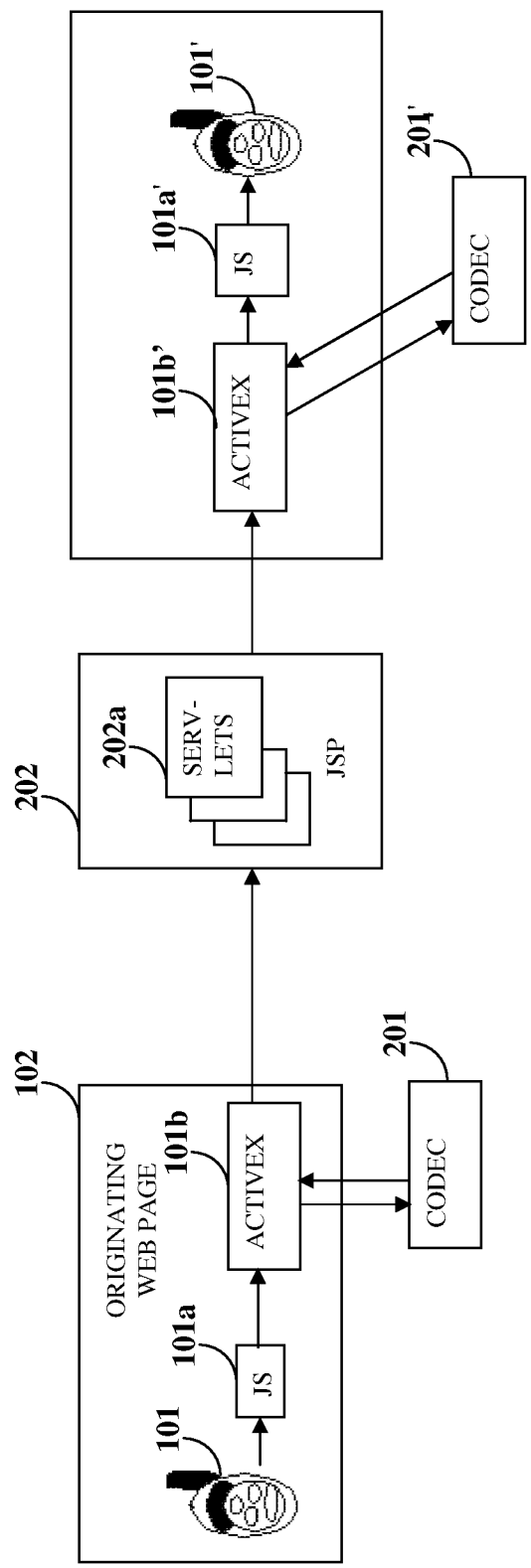
FIG. 2 exemplarily illustrates software elements of a sender's client component, a messaging server, and a recipient's client component used for exchanging voice messages between a sender and a recipient.

FIG. 2 exemplarily illustrates software elements of a sender's client component 101, a messaging server 105, and a recipient's client component 101' used for exchanging voice messages between a sender and a recipient. The sender accesses the client component 101 over a website and creates an audio or voice message using the client component 101. The client component 101 comprises, for example, a Macromedia Flash interface herein referred to as a "Flash interface" of Adobe Systems, Incorporated, which drives a JavaScript (JS) 101*a* element, which in turn controls an ActiveX 101*b* control that uses standard or custom audio encoding/decoding codecs 201. The messaging server 105 implements Java servlets 202*a*, Enterprise JavaBeans 202*d*, a web and application server, and generic database technology as exemplarily illustrated in FIG. 4. The messaging server 105 implements a Java technology, for example, JavaServer pages (JSP) 202 utilized for dynamically generating web pages based on a hypertext markup language (HTML), an extensible markup language (XML), or other document types.

The client component 101' on the recipient's computing device 107 comprises a standard browser structured into areas for displaying the web page 102' comprising active connections for the recipient and the client component 101' for message playback and recording. The client component 101, 101' is embedded in a web page 102, 102' enabled with variations of the embodiments of the client component 101, 101' to involve alternatives in each of the components. The client component 101' comprises, for example, a Flash interface that drives a JavaScript (JS) 101*a*' element, which in turn controls an ActiveX 101*b*' control that uses standard or custom audio encoding/decoding codecs 201'.

A Flash interface or object drives the JavaScript 101*a* element which in turn controls, for example, an ActiveX 101*b* control. The ActiveX 101*b* control employs a codec 201 to capture and store audio files. The ActiveX 101*b* control sends the captured and stored audio files to a JavaServer pages (JSP) 202 element and a Java servlets 202*a* element on the messaging server 105 that handles disposition of messages. The messaging server 105 then assigns the message to a recipient and transfers the messages to the recipient's client component 101'. The recipient controls playback using the Flash interface in a manner similar to the sender side for driving the JavaScript 101*a*' element. The JavaScript 101*a*' element controls the ActiveX 101*b*' control. The ActiveX 101*b*' control employs a codec 201' to retrieve and play the audio message, capture the recipient's response to the sender's question, and send the recipient's response back to the messaging server 105. The messaging server 105 sends a response to the client component 101 on the sender's computing device 103 for playback in a manner similar to the playback on the recipient's client component 101'.

In an embodiment, the ActiveX 101*b*, 101*b*' portion of the client component 101, 101' is replaced by Java. Java promotes cross platform operation, and thereby increases user acceptance. The ActiveX 101*b*, 101*b*' portion of the client component 101, 101' may also be replaced by Microsoft .NET elements. Microsoft .NET reduces security screening issues at client download time, thereby enhancing usability. In an embodiment, the codec 201, 201' portion of the client component 101, 101' is substituted and included in a download package while downloading the client component 101, 101'. This aids in cross-platform compatibility, but increases download size.

The recipient's client component 101' comprises a standard browser segmented into areas comprised of the sender URL area showing originating web page 102 information, the connection management area 108, and the client component area 109 as exemplarily illustrated in FIG. 1. These are the basic elements required to enable a rich customer service delivery process. In some circumstances, enterprises receiving "arbitrarily addressed" messages may use their customer relationship management (CRM) tools instead of a formal recipient client component 101'.

In an embodiment, the client component area 109 comprises a screen area displaying the client component 101' player, which is comprised of the Flash interface, the JavaScript 101*a*' element, and the ActiveX 101*b*' control, with reliance upon supplemental codecs 201' for audio record and playback. These codecs 201' may be added to this system 100 by the operating system itself, as in the case of Windows, or via custom development.

The sender URL area comprises a screen area in which the sender URL that accompanied the sender message is expanded to show the recipient from where the message originated in the client component enabled website. In the embodiment involving sender-addressed messages, this would not be the enterprise website, but would be a web hosting service account page, or would involve no page at all in the case of a standalone client component 101, 101'. The connection management area 108 comprises graphical icons indicating sender sessions currently assigned to the recipient, and which sender is in focus in the sender URL area undergoing service delivery.

The recipient's client component 101' assumes innumerable realizations as the core elements may recombine as desired by the senders. Each of the core elements may be realized using various technologies, thereby creating a large combination of possible instantiations in varied configurations.

In an embodiment, the client component 101 comprising the ActiveX 101*b* control, the Flash interface, and the JavaScript 101*a* element working with the supplemental codec 201, is connected among its components as follows: The Flash interface of the client component 101 collects sender input in the form of button key presses and mouse hovering. The Flash interface passes these events to the JavaScript 101*a* element, which in turn passes the events to the ActiveX 101*b* control. The ActiveX 101*b* control then may interact with operating system audio services, supplying an audio file to play, or instructing the operating system audio services to capture audio stream from an input device such as a microphone. The ActiveX 101*b* control may also interact with the messaging server 105 components getmessage 202*b* and postmessage 202*c*, and may execute HTTP PUT, POST and GET commands for transportation and retrieval of audio files, the sender URL, and other sender data. The client component 101, 101' connectivity applies to both sender and recipient instantiations of the client component 101, 101'.

Figure 3:
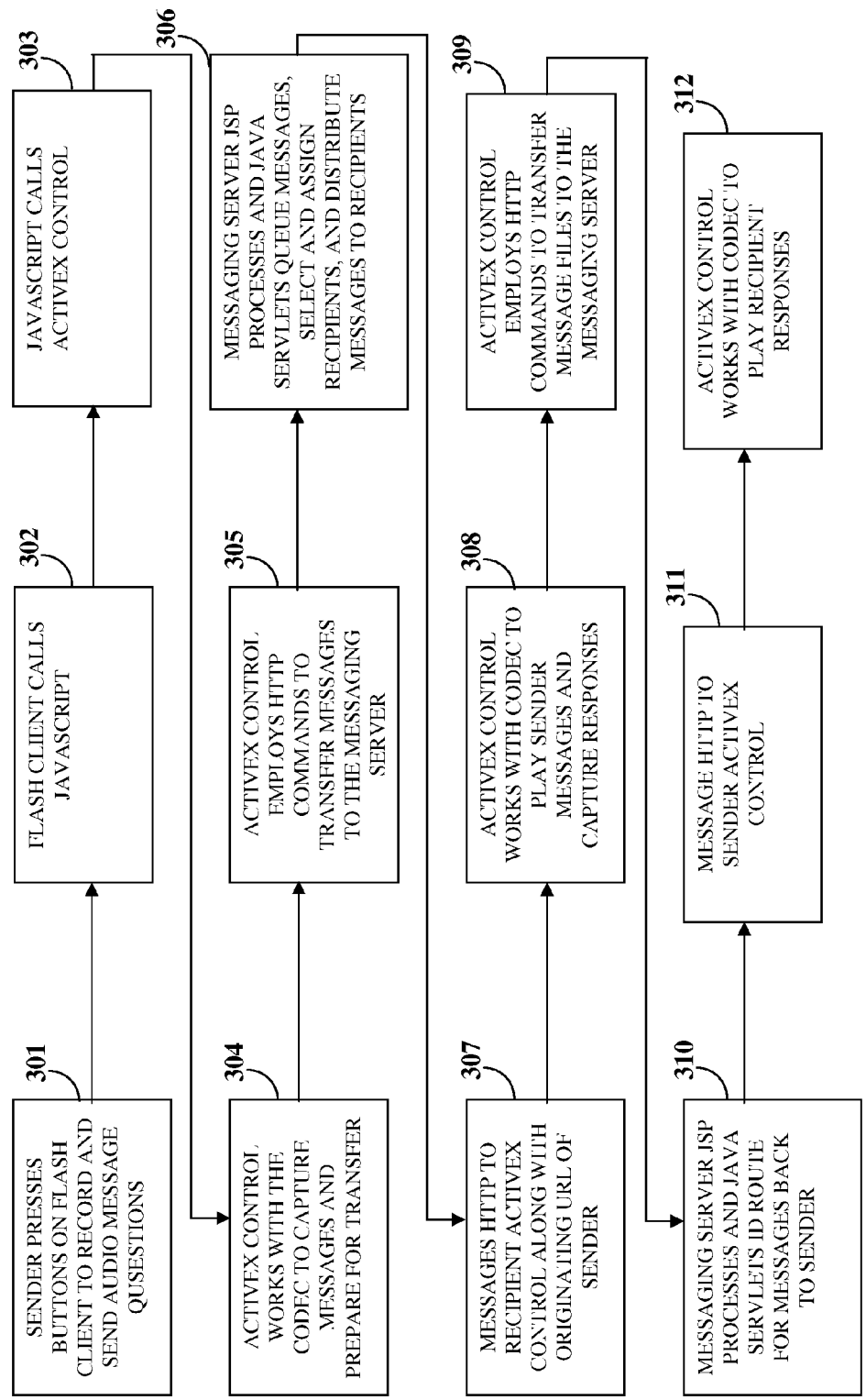
FIG. 3 exemplarily illustrates a flow diagram comprising the steps for sending messages to recipients by a sender and receiving messages by the sender from the recipients over a response path.

FIG. 3 exemplarily illustrates a flow diagram comprising the steps for sending messages to recipients by a sender and receiving messages by the sender from the recipients over a response path. The sender presses 301 buttons on the client component 101 via the Flash interface, also referred to as a "Flash client", to record and send questions through audio messages to the recipients. The Flash interface calls 302 the JavaScript 101*a* element. The JavaScript 101*a* element calls 303 the ActiveX 101*b* control as exemplarily illustrated in FIG. 2. The ActiveX 101*b* control works with the codec 201 to capture 304 audio messages and prepare for transfer of the audio messages. The ActiveX 101*b* control employs hypertext transfer protocol (HTTP) commands to transfer 305 the audio messages to the messaging server 105. The JSP 202 element on the messaging server 105 processes 306 the audio messages. The Java servlets 202*a* element on the messaging server 105 queues 306 the audio messages, and selects and assigns recipients to the audio messages. The Java servlets 202*a* element then distributes the audio messages to the recipients.

The audio messages are sent 307 to the ActiveX 101*b*' control on the recipient's computing device 107 along with a uniform resource locator (URL) of the originating web page 102 from which the sender records the audio messages via HTTP. The ActiveX 101*b*' control works with the codec 201', as exemplarily illustrated in FIG. 2, to play 308 the audio messages recorded by the sender and capture responses. The ActiveX 101*b*' control employs 309 HTTP commands to transfer audio response message files to the messaging server 105. The JSP 202 element on the messaging server 105 processes 310 the audio response messages and the Java servlets 202*a* element on the messaging server 105 routes the response messages back to the sender. The messaging server 105 sends 311 the audio response messages to the ActiveX 101*b* control on the sender's client component 101 via HTTP commands. The ActiveX 101*b* control works 312 with the codec 201 to play the responses from the recipient.

Figure 4:
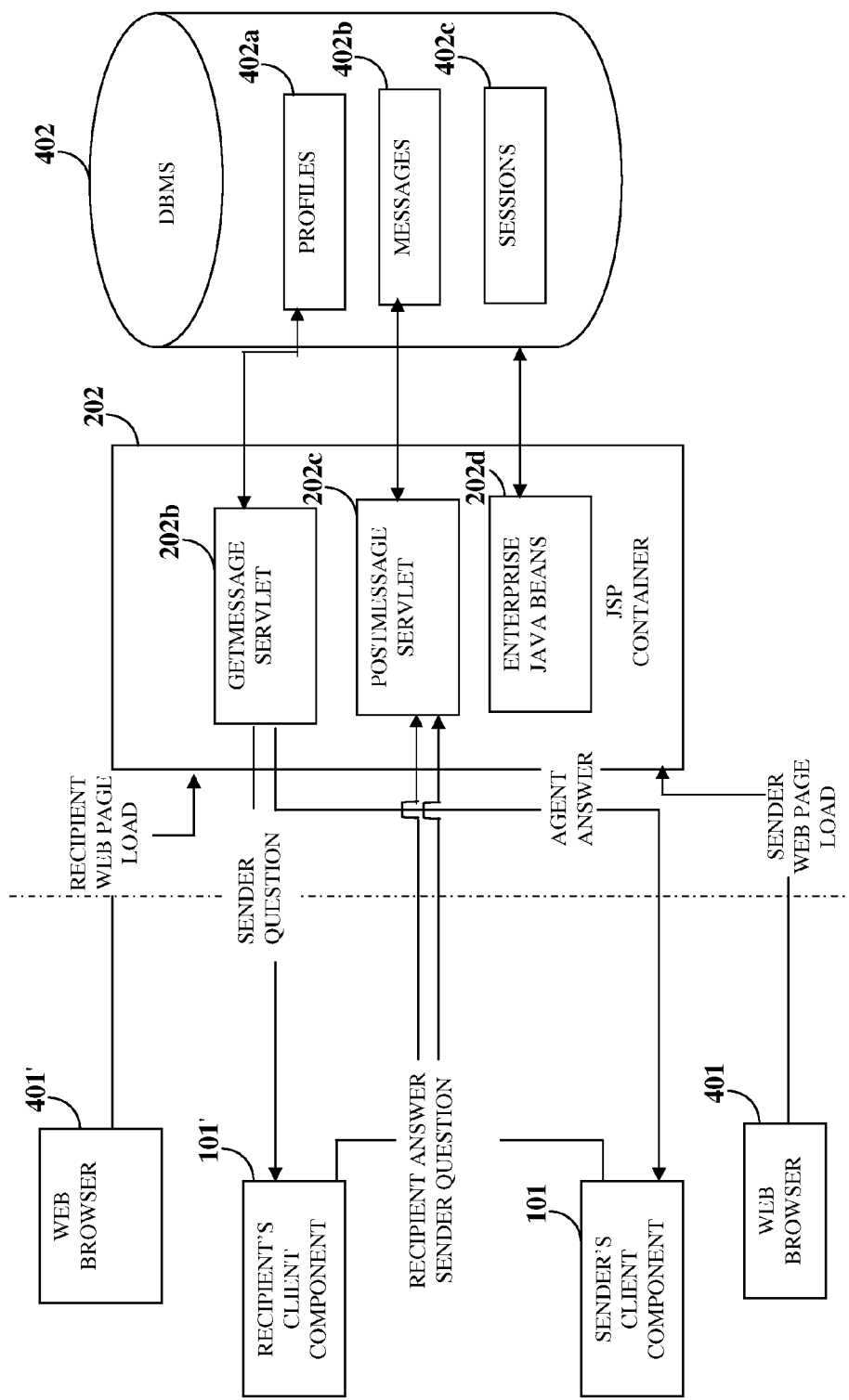
FIG. 4 exemplarily illustrates a system view with a high level process flow for exchanging voice messages between a sender and a recipient.

FIG. 4 exemplarily illustrates a system view with a high level process flow for exchanging voice messages between a sender and a recipient. The messaging server 105 connectivity comprises a Java servlets 202*a* element interacting with an Enterprise JavaBeans 202*d* element, a web server (Tomcat) server acting as a JavaServer pages (JSP) 202 container, and generic database technology. The Java servlets 202*a* element comprises a getmessage servlet 202*b* and a postmessage servlet 202*c* and interacts with the ActiveX 101*b*, 101*b*' control of the client component 101, 101' as exemplarily illustrated in FIG. 2. The Java servlets 202*a* element also feeds the JSP 202 logic that assigns and delivers sender data enhanced messages to recipients, and accepts their responses. The Java servlets 202*a* element also interacts with a subordinate database management system (DBMS) 402 technology employing Java database connectivity (JDBC) to insert and retrieve records into a database. The JSP 202 element of the messaging server 105 interacts with the Java servlets 202*a* element to accept and push content to senders and recipients.

On the sender side, the messaging server 105 pushes audio responses created by the recipients, using HTTP to communicate with the sender side web browser 401. The messaging server 105 also communicates through the ActiveX 101*b* control, and indirectly to the JavaScript 101*a* element, and indirectly to the client component's 101 Flash interface to manage playback-control-button states, display message information on the client component 101 for presentation to the sender, and to push audio content to the client component 101.

On the recipient side, the messaging server 105 employs HTTP to push sender URL data to the sender URL area, and to push connection management information to the connection management area 108, as exemplarily illustrated in FIG. 1, of the recipient's web browser 401'. The messaging server 105 also interacts with the recipient's instance of the client component 101' in the client component area 109 of the recipient's web browser 401' in the manner described above, with the distinction that the messaging server 105 responds to the recipient's play requests for sender input by updating the connection management area 108, and by retrieving content corresponding to the sender URL, and displaying the content in the sender URL area of the recipient's web browser 401'.

The sender visits a website comprising the client component 101 via the sender's web browser 401. The sender creates an audio message using the client component 101. The ActiveX 101*b* control manages the collection and posting of the audio message to the messaging server 105. The postmessage servlet 202*c* on the messaging server 105 handles the collection and posting of the audio messages to the recipient. The postmessage servlet 202*c* establishes a connection with the database management system (DBMS) 402 and creates a session 402*c*. The DBMS 402 stores the profiles 402*a* of the senders. If a new sender sends a message, then a new profile is created on the DBMS 402. The message 402*b* is stored in the DBMS 402 for awaiting assignment to a recipient, or for forwarding to a recipient in case the message exchange is a part of an existing session 402*c*. The JavaBean 202*d* explorer classes embedded in the JSP 202 processes of the messaging server 105 fetch data from the DBMS 402, assess the new sender's contact information, and identify an available recipient for assignment of the message 402*b*, or the incumbent recipient for the session 402*c*. If an incumbent recipient has since become unavailable, the JSP 202 process selects a new recipient. The JSP 202 process then instructs the getmessage servlet 202*b* on the messaging server 105 to retrieve the audio message 402*b* from the DBMS 402 and deliver the retrieved audio message 402*b* to the selected recipient for playback on the recipient's client component 101'. Once the recipient has completed an audio response to the audio message 402*b* using the client component 101' via the web browser 401', the client component's 101' ActiveX 101*b*' control posts the message 402*b* to the postmessage servlet 202*c* which in turn inserts the message 402*b* into the DBMS 402. The getmessage servlet 202*b* notices the assignment and delivers the response message 402*b* to the sender for playback on the sender's client component 101.

In an embodiment, the Flash interface of the client component 101, 101' is replaced with a Java applet residing in a browser application or as a Java application running external to the browser application on the computing devices 103, 107, for example, a personal computer, a laptop, a mobile device, a tablet computing device, etc. In the case of a Java application, the service model assumes a standard client-server architecture, for example, 2-party architecture, and facilitates direct messaging to the host. In another embodiment, the Flash interface is also replaced by a JavaScript 101*a*, 101*a*' element or Java, thereby reducing the need of a Flash enabled browser 401, 401'. In another embodiment, the JavaScript 101*a*, 101*a*' element in the client component 101, 101' is replaced using a Visual Basic (VB) script of another language. Each of the alternatives impacts the user base as their ubiquity on user platforms is not assured.

Figure 5:
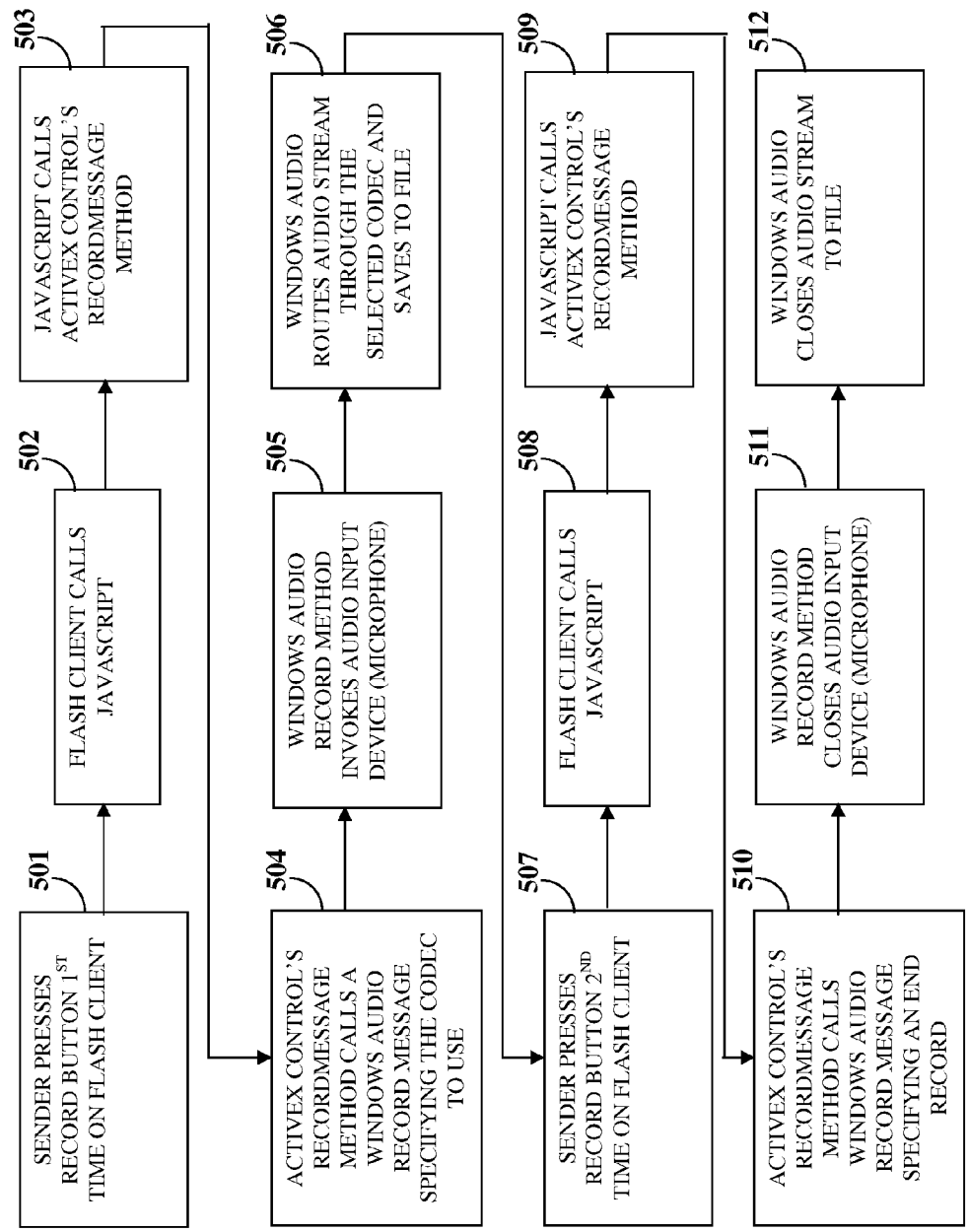
FIG. 5 exemplarily illustrates a flow diagram comprising the steps for recording audio messages on the client component.

FIG. 5 exemplarily illustrates a flow diagram comprising the steps for recording audio messages on the client component 101. The sender presses 501 a record button a first time on the Flash interface, also referred to as a "Flash client", of the client component 101. The Flash interface calls 502 the JavaScript 101*a* element. The JavaScript 101*a* element calls 503 the ActiveX 101*b* control's "recordmessage" method. The ActiveX 101*b* control's "recordmessage" method calls 504 a Windows audio record message specifying the codec 201 to be used. The Windows audio record method invokes 505 an audio input device, for example, a microphone on the sender's computing device 103. The Windows audio routes 506 the audio stream through the selected codec 201 and saves the message to a file. The sender presses 507 the record button a second time on the Flash interface of the client component 101. The Flash interface calls 508 the JavaScript 101*a* element. The JavaScript 101*a* element calls 509 the ActiveX 101*b* control's "recordmessage" method. The ActiveX 101*b* control's "recordmessage" method calls 510 the Windows audio record message specifying an end record. The Windows audio record method closes 511 the audio input device. The Windows audio closes 512 the audio stream to the file.

Figure 6:
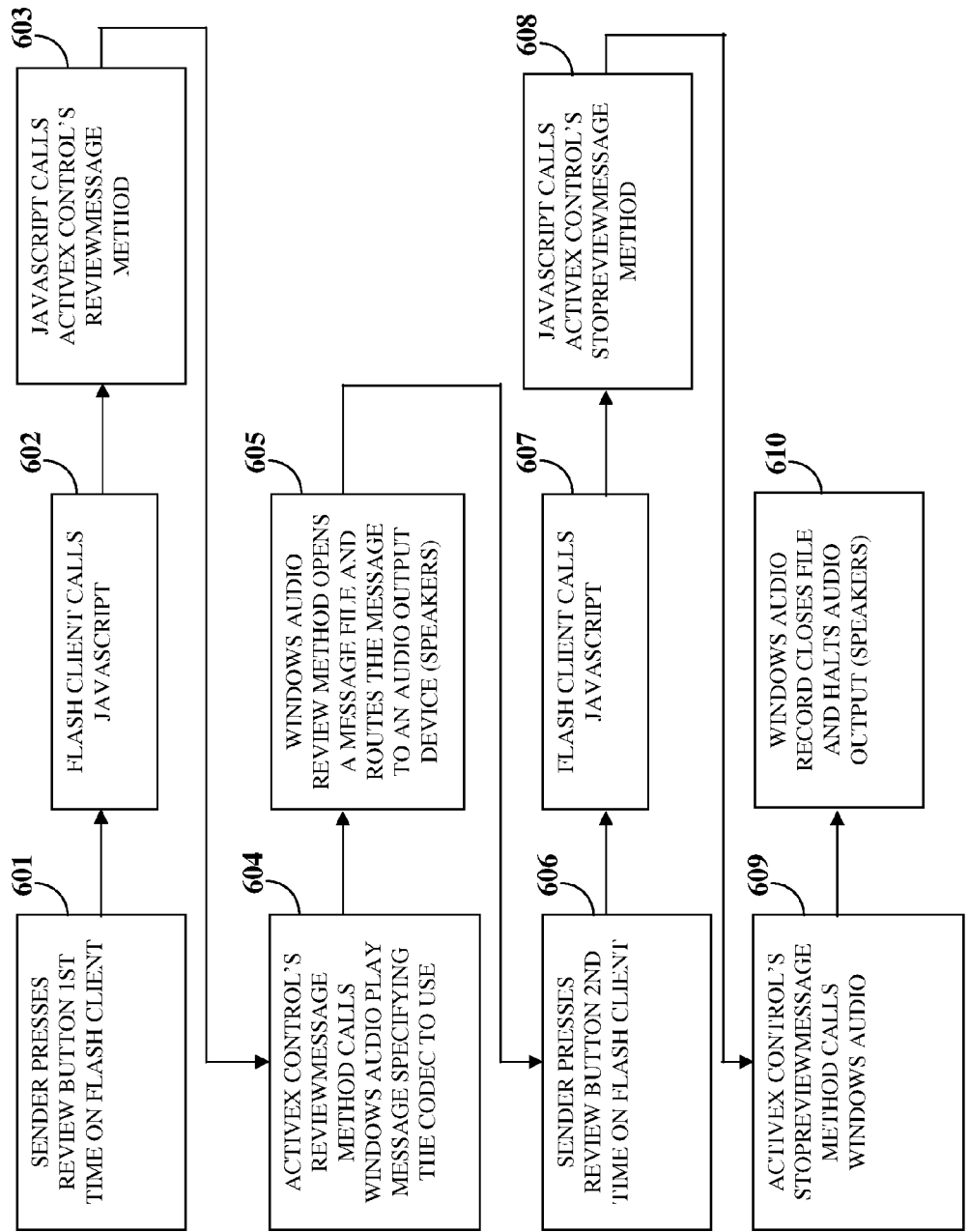
FIG. 6 exemplarily illustrates a flow diagram comprising the steps for reviewing the recorded audio messages on the client component.

FIG. 6 exemplarily illustrates a flow diagram comprising the steps for reviewing the recorded audio messages on the client component 101. The sender presses 601 a review button a first time on the client component 101 via the Flash interface, also referred to as a "Flash client". The Flash interface calls 602 the JavaScript 101*a* element. The JavaScript 101*a* element calls 603 the ActiveX 101*b* control "reviewmessage" method. The ActiveX 101*b* control's "reviewmessage" method calls 604 the Windows audio play message specifying the codec 201 to be used. The Windows audio review method opens 605 a message file and routes the message to an audio output device, for example, speakers. The sender presses 606 the review button a second time on the Flash interface. The Flash interface calls 607 the JavaScript 101*a* element. The JavaScript 101*a* element calls 608 the ActiveX 101*b* control's "stopreviewmessage" method. The ActiveX 101*b* control's "stopreviewmessage" method calls 609 the Windows audio. The Windows audio record closes 610 the message file and halts the audio output device.

Figure 7:
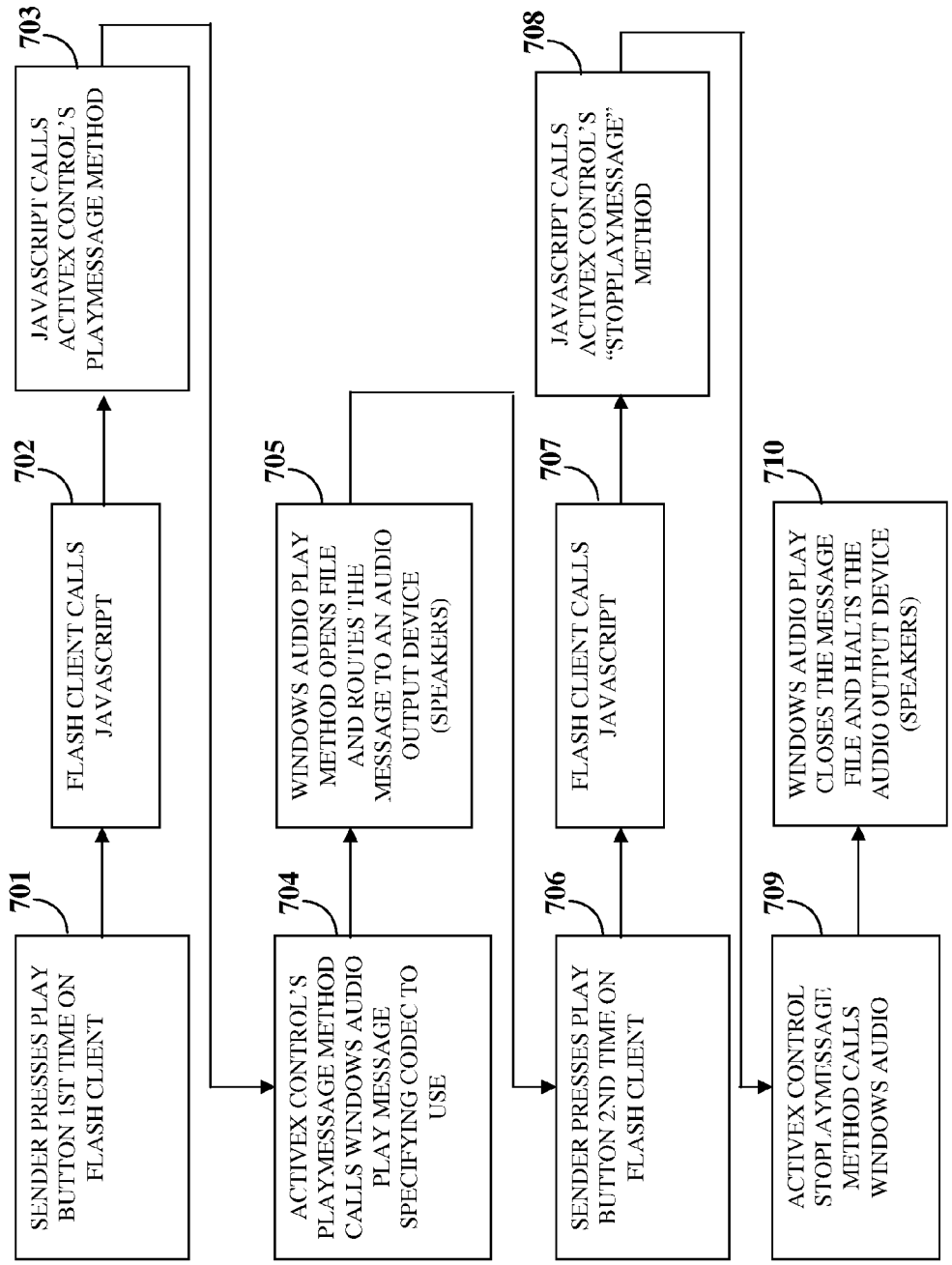
FIG. 7 exemplarily illustrates a flow diagram comprising the steps for playing the recorded audio messages on the client component.

FIG. 7 exemplarily illustrates a flow diagram comprising the steps for playing the recorded audio messages on the client component 101. The sender presses 701 a play button a first time on the client component 101 via the Flash interface, also referred to as a "Flash client". The Flash interface calls 702 the JavaScript 101*a* element. The JavaScript 101*a* element calls 703 the ActiveX 101*b* control's "playmessage" method. The ActiveX 101*b* control's "playmessage" method calls 704 the Windows audio play message specifying the codec 201 to be used. The Windows audio play method opens 705 a message file and routes the message to an audio output device, for example, speakers. The sender presses 706 the play button a second time on the Flash interface of the client component 101. The Flash interface calls 707 the JavaScript 101*a* element. The JavaScript 101*a* element calls 708 the ActiveX 101*b* control's "stopplaymessage" method. The ActiveX 101*b* control's "stopplaymessage" method calls 709 Windows audio. The Windows audio play closes 710 the message file and halts the audio output device.

Figure 8:
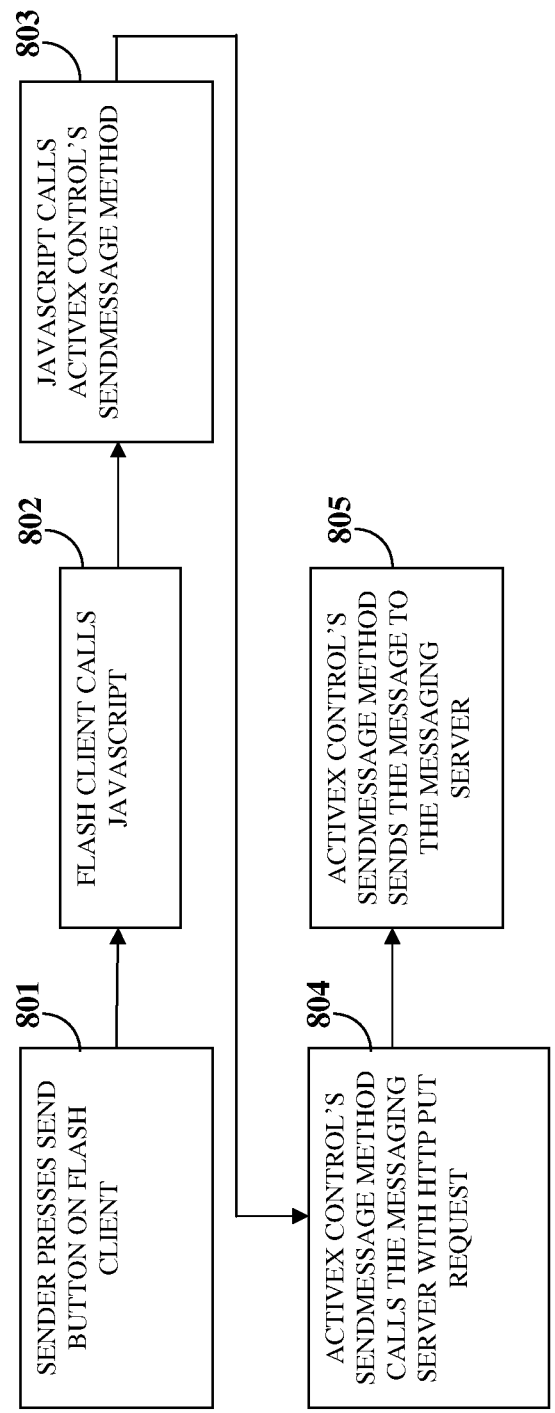
FIG. 8 exemplarily illustrates a flow diagram comprising the steps for sending the recorded audio messages from the client component to a messaging server.

FIG. 8 exemplarily illustrates a flow diagram comprising the steps for sending the recorded audio messages from the client component 101 to the messaging server 105. The sender presses 801 a send button on the client component 101 via the Flash interface, also referred to as a "Flash client". The Flash interface calls 802 the JavaScript 101*a* element. The JavaScript 101*a* element calls 803 the ActiveX 101*b* control's "sendmessage" method. The ActiveX 101*b* control's "sendmessage" method calls 804 the messaging server 105 with an HTTP "PUT" request. The ActiveX 101*b* control's "sendmessage" method sends 805 the message to the messaging server 105.

Functionally, the client component 101, 101' operates in either 3-party mode or 2-party peer-to-peer mode. Reduction to practice focused upon the 3-party mode. In either the 3-party mode or the 2-party mode, the client component 101, 101' functions identically from a user perspective. In the 3-party mode, messages route to the messaging server 105, where the messaging server 105 may distribute the messages to multiple recipients by applying an assignment availability algorithm (mode 1), or to specific single recipients with no assignment analysis required (mode 2), for example, in a service brokerage between providers and customers. In the 2-party mode, the sender's messages route to a single predefined specific recipient directly. The sender may not direct the message routing as this would disrupt the N:1 service model, where N senders employ a tool to communicate with 1 recipient. In an embodiment, a provision is made for sender addressing to allow for addressing to arbitrary recipients. In an embodiment, the client component 101 requires message addressing, but otherwise functions in a similar manner. Transport for the 2-party mode employs a simple mail transfer protocol (SMTP), or a specially developed light transport client designed expressly for this purpose.

The client message handling of the client component 101, 101' currently employs encoding voice and using hypertext transfer protocol (HTTP) for file transfer. This transfer could alternatively employ a file transfer protocol (FTP) or another file transfer protocol with no effective difference, other than potential diminished performance. Due to communication delays in file transfer, the method of message handling involves, for example, encoding and immediate streaming of a message file to the messaging server 105 to reduce perceived transmission time. The client streaming functionality of the client component 101, 101' thus changes a send command to an implicit "approve and post" command for the message file as the message file has already, or is already, in transit upon command issuance. This provides marginal transfer time improvement, however, as the client component 101, 101' generates small audio files. The inclusion of streaming logic would increase download package size and retard initial client download, diminishing the improvement accordingly in a tradeoff. Alternative message handling involves, for example, immediate streaming of audio prior to an encoding step, but the resulting file size of the stream could be prohibitive and defeat the gains of early transfer. Alternative message handling also employs SMTP-style file transfer to affect file transfer to the destination; this would be problematic, however, as variations in user platform configuration may reduce broad applicability.

As disclosed in the detailed description of FIG. 2, the messaging server 105 comprises, for example, the Java servlets 202*a* element, the Enterprise JavaBeans 202*d* element, a Tomcat server, and generic database technology. The messaging server 105 executes a JSP 202 element and business logic related to managing the availability of recipients and assignment of sender-originated messages that include audio, URL data, and sender data elements. Sender messages further comprise, for example, text, fax, and video. The messaging server 105 also manages audio responses from the recipient, routing, then delivering them to the originating sender's client component 101 for playback on the sender's computing device 103.

The messaging server 105 may also be implemented with alternative technologies for dynamic page creation and delivery. The messaging server 105 may also employ alternative web and application server technologies, for example, Microsoft Internet Information Services (IIS). These alternatives do not offer substantive advantages to the messaging server 105 function, but may suit users of the client component 101, 101' due to pre-existence in customer infrastructure. Functionally, the messaging server 105 may operate in 2 modes in a 3-party service model, or be omitted from the system 100 with a modified client component 101, 101' performing peer-to-peer 2-party communication in a 2-party model.

Variations on the client component's 101, 101' inter-process communication derives from at least three sources, those being alternate development technology, or alternate client component topology in service of 2-party versus 3-party models, or from a standalone client component 101, 101'. Regarding alternate technology, the Flash graphical user interface (GUI) portion of the client component 101, 101' may be replaced with a Java applet resident in a browser 401, 401', or as a Java application running outside of a browser 401, 401' on a desktop, a laptop, a mobile device, etc., or as a JavaScript browser application. This might include remote procedure call (RPC)-style communication, file transfer protocol (FTP) interaction, and other functional equivalents for use in a conventional client-server model.

If the Flash GUI were indeed replaced by JavaScript 101a, 101a' or a Java Applet, this would eliminate the need for a Flash plug-in in the browser 401, 401'. Inter process communication would thus rely upon Java messaging. The JavaScript 101a, 101a' portion of the client component 101, 101' may be replaced using VB script or another scripting language. In the event of a Java application or other conventional non-web oriented model, inter process communication depends upon the design of the tools. Each of these alternatives, however, impacts the user base, as their ubiquity on Windows platforms is not assured.

As suggested, another alternate instantiation alluded to above arises from the 2-party communication model versus the 3-party model. This service structure implements N:1 messaging, where N senders may message 1 and only 1 recipient. This is in contrast to the 3-party model that enables multiple recipients to service an arbitrary number of senders. This application is most likely in small businesses such as sole proprietorships, or in small professional practices.

The ActiveX 101b, 101b' portion of the client component 101, 101' may be replaced by Java. Java, however, is not as efficient to integrate with Windows audio services and could impact codec operation. The ActiveX 101b, 101b' portion of the client component 101, 101' may also be replaced by Java. This is a desirable alternative to that used in reduction to practice in the client component prototype that operated successfully end-to-end-to-end as the client component 101, 101' becomes portable to more platforms and browsers. In the codec 201, 201' portion of the client component 101, 101', one may substitute a custom codec 201, 201' and include the codec 201, 201' in a download package at client download time. This would eliminate Windows application programming interface (API) calls to the audio system, replacing them with API calls of the codec 201, 201'.

Additional variations upon 3-party and 2-party themes assume somewhat academic options entirely motivated by the desire to circumvent the protection this patent application seeks. Some of these include a 3-party system that includes peer-to-peer file transfer of audio and related data initiated but not mediated by the messaging server 105. Additionally, 3-party solutions could employ SMTP or FTP as a means for file transfer. Other variations could include conversion of audio messages into telephony streams directed into a voice mail system or other telephony infrastructure.

Figure 9:
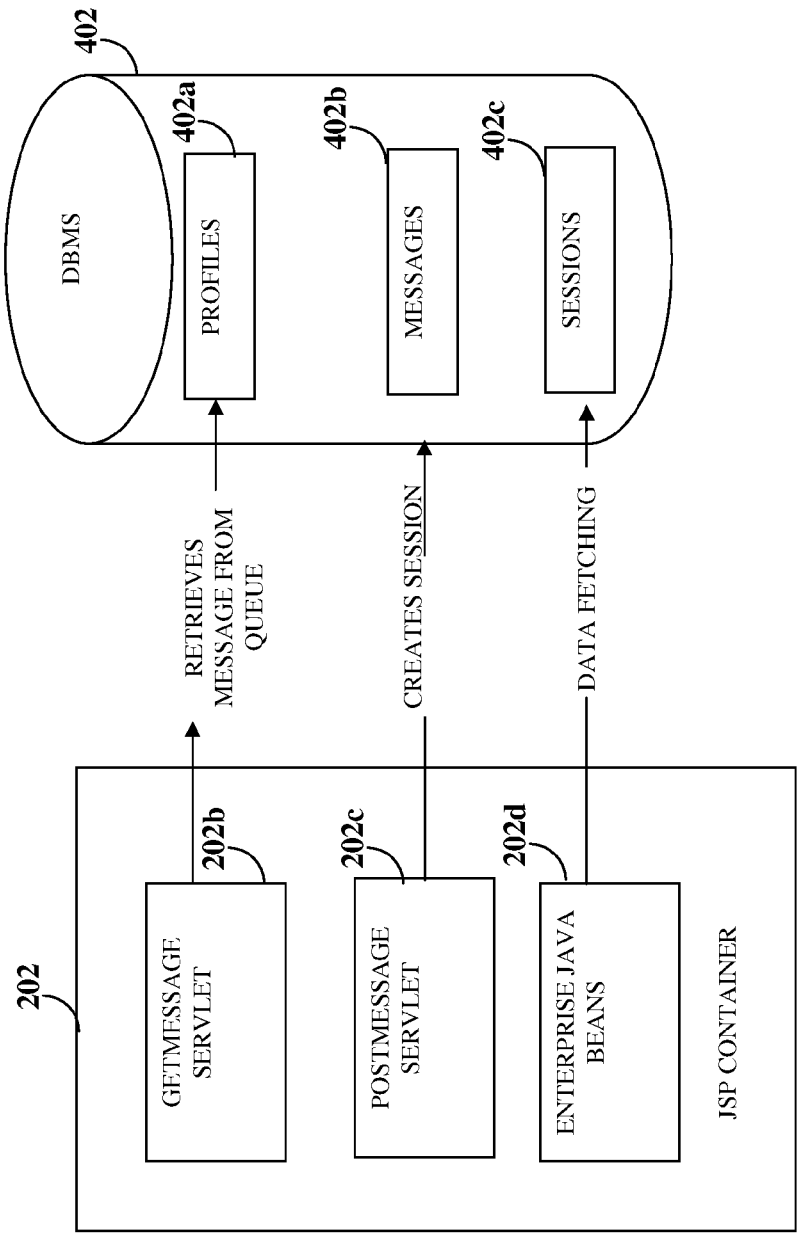
FIG. 9 exemplarily illustrates interaction of the messaging server with a database management system.

FIG. 9 exemplarily illustrates interaction of the messaging server 105 with a database management system (DBMS) 402. The messaging server 105 interacts with the DBMS 402 for receiving, storing, retrieving, and transmitting voice messages sent by the sender using the client component 101 as disclosed in the detailed description of FIG. 4.

Figure 10:
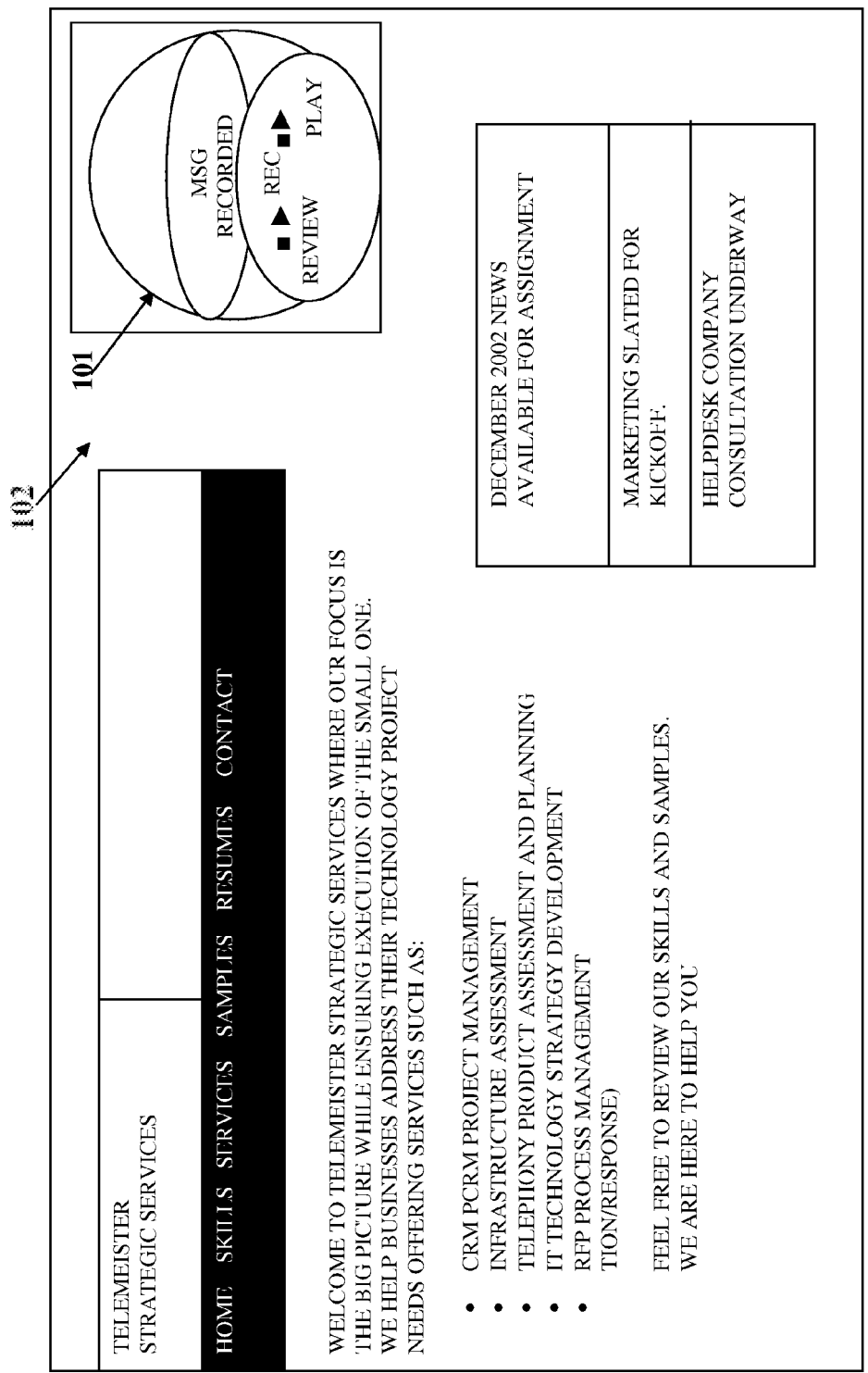
FIG. 10 exemplarily illustrates a screenshot of a web page with an embedded client component.

FIG. 10 exemplarily illustrates a screenshot of a web page 102 with an embedded client component 101. In an embodiment, the client component 101 is a browser based application provided on a web hosting service. In this embodiment, the client component 101 is embedded in the web page 102 of a website hosted by the web hosting service as exemplarily illustrated in FIG. 10.

Figure 11:
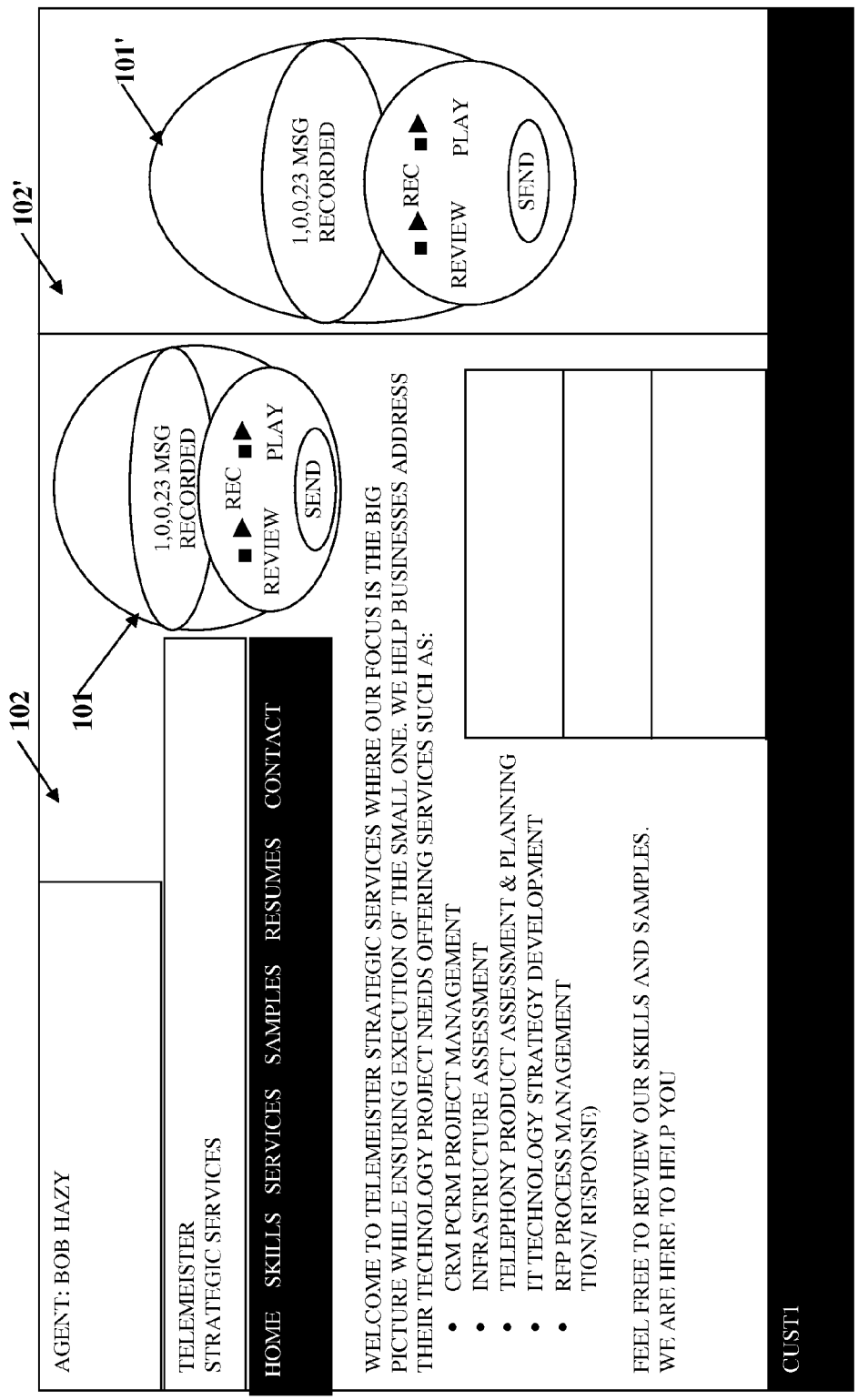
FIG. 11 exemplarily illustrates a screenshot of a graphical user interface provided by a browser based application with an embedded client component.

FIG. 11 exemplarily illustrates a screenshot of a graphical user interface provided by a browser based application with an embedded client component 101, 101'. A sender, for example, a customer can use the client component 101 embedded in a web page 102 to record questions and transmit the questions to a recipient, for example, an agent. The recipient can use the embedded client component 101' to record a response message to the sender.

Several additional embodiments present themselves in the realization of the client component 101, 101', each being inspired by the method and system 100 disclosed herein. The embodiments comprise analyzing the sender URL and other sender data to accomplish routing in the messaging server 105 logic. This would allow call centers to triage messages and deliver them to subject experts. Further embodiments along this line would involve speech to text analysis and key word spotting within the audio stream to accomplish the same purpose. Other embodiments at the same logic step of the service cycle would facilitate business logic controllable by the host of the system 100 such as "business day" rules versus off hour rules, and auto-audio responses generated during relevant times to manage sender expectations when the service is likely to be delayed.

In addition to routing, complementary applications may develop as enabled directly by the method and system 100 disclosed herein. These applications are, for example, 3-party incident billing systems, 3-party subscription billing systems, and two party equivalents. Additional applications comprise, for example, application service provider (ASP) hosted 3-party solutions in a service bureau configuration for all variations of systems above and related billing systems. Additional embodiments, for example, sender authentication and voice or audio encryption, or employment of digital signatures to establish sender identity in the client component 101 pertinent to security are also provided by the method and system 100 disclosed herein. Additional embodiments that enrich the communication stream are also provided by the method and system 100 disclosed herein. These embodiments comprise, for example, bundling attachments with messages to aid in the dialog or for other purposes, and creation of a spontaneous customized portal for senders or recipients, which house relevant material.

In the detailed description of FIGS. 1-11, the framework for the audio or voice message driven customer interaction queuing system provides a client component 101, 101' in the form of a browser-resident recorder application instantiated on an electronic commerce (e-commerce) website. The entity responsible for the e-commerce website has to invite the sender for voice interaction by enabling the web pages 102 of the e-commerce website with the components of the client component 101 as a prerequisite. Furthermore, messages posted through the client component enabled web pages 102 have no need for addressing because they were proffered by a client component 101 bound to an entity or a vendor who could control that offering. Even if the vendor was brokering messages between many senders and many sub-vendors, the context for the voice messages always provides a means to resolve the intended recipient.

Figure 12:
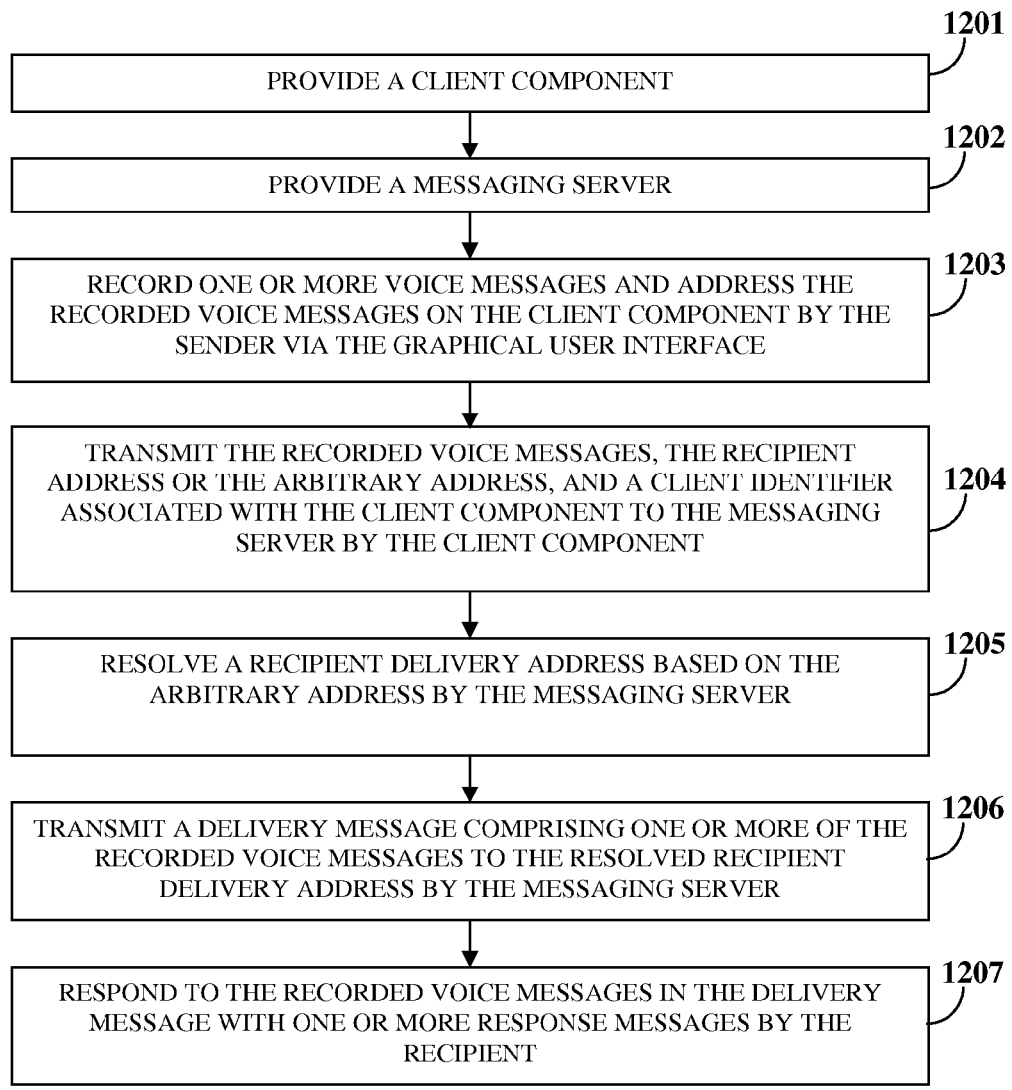
FIG. 12 illustrates a computer implemented method for exchanging voice messages between a sender and a recipient.

FIG. 12 illustrates a computer implemented method for exchanging voice messages between a sender and a recipient. The "sender" refers, for example, to a user, a consumer, a customer, etc., who wishes to utter a question or send a message to a recipient, for example, a service agent. The "recipient" refers to an enterprise, an organization, an entity, or another user, etc., that provides services, addresses queries, receives customer feedback, provides customer support, etc. The client component 101, 101' is provided 1201, for example, as a standalone application on a computing device 103 of the sender and the recipient or on a browser based application provided on a webhosting service.

In an embodiment, the client component 101, 101' is made available for download through the web hosting service of a messaging server 105. The sender can access the client component 101 installed on the sender's computing device 103, for example, a mobile phone, a tablet computer, a personal digital assistant, a personal computer, a laptop, etc., utilize the browser based application on the web hosting service, or access the client component 101 via the communication network 104 to render one or more voice messages to the recipient. The recipient can access the client component 101' installed on the recipient's computing device 107, utilize the browser based application on the web hosting service, or access the client component 101' via the communication network 104 to transmit response messages to the sender.

The messaging server 105 that enables interaction between the sender and the recipient for exchanging voice messages is also provided 1202. In an embodiment, the sender registers with the messaging server 105 for maintaining an account for sending voice messages to the recipient and for receiving response messages from the recipient. The recipient may also register an address with the messaging server 105 for subsequent message exchanges. In another embodiment, the sender may visit a website hosted by the web hosting service as a guest to submit messages anonymously, but still receive response messages via the messaging server 105. The client component 101 renders a graphical user interface that allows the sender to create, address, and render the voice messages to the recipient. The graphical user interface facilitates interaction between the sender and the client component 101.

The client component 101 is pre-configured to capture voice input from the sender. The client component 101 enables the sender to record 1203 one or more voice messages. The sender addresses 1203 the recorded voice messages on the client component 101 via the graphical user interface. The sender addresses each of the recorded voice messages by entering a recipient address or an arbitrary address on the graphical user interface of the client component 101. As used herein, the term "recipient address" refers to an actual address of the recipient known to the sender. Also, as used herein, the term "arbitrary address" refers to a non-specific or indefinite address or string associated with the recipient that is provided by the sender, if the actual address of the recipient is not known to the sender.

Figure 17A:
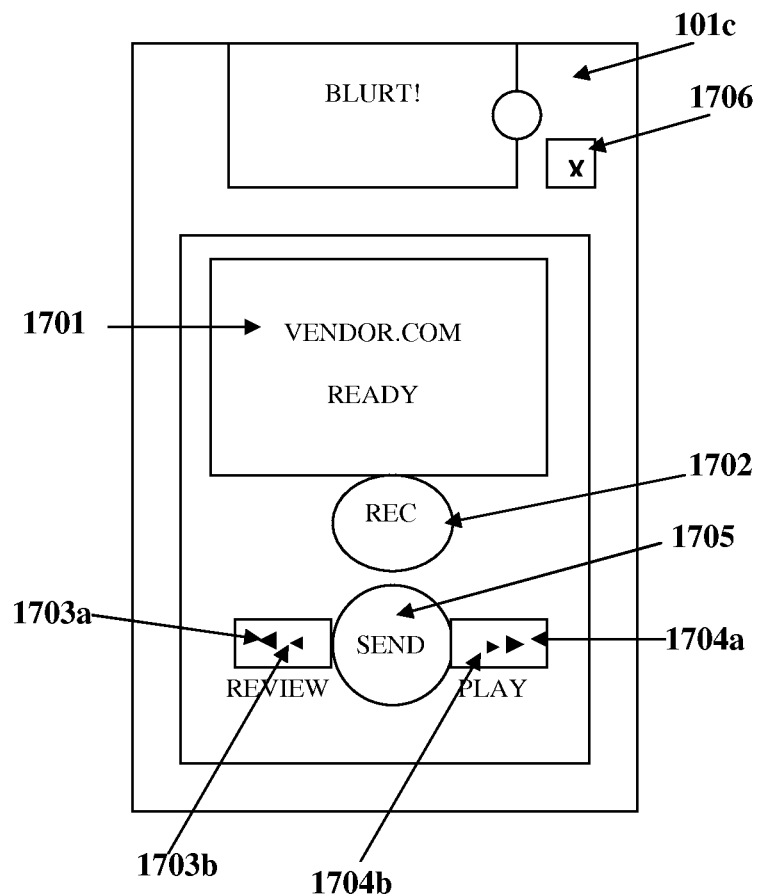
FIGS. 17A-17B exemplarily illustrate the graphical user interface of the client component for recording and sending voice messages.
Figure 17B:
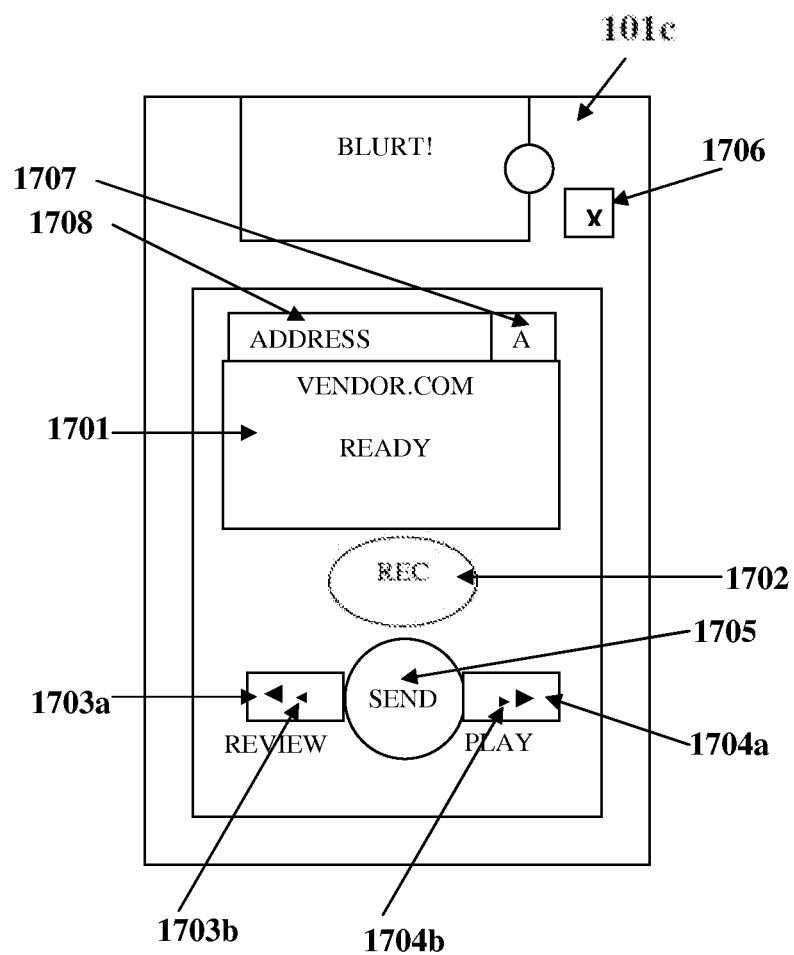

The graphical user interface displays an address field 1708 as exemplarily illustrated in FIG. 17B, to accept target addresses from the sender. The address field 1708 may contain the word "address" to cue the sender, or may be blank. In an embodiment, the address field 1708 operates as a drop down menu with a list of popular target addresses permitting the sender to select one or more target addresses from the list of popular target addresses. In another embodiment, the address field 1708 operates with auto-fill and auto-complete features that anticipate the sender by providing suggestions as the sender types the target address. The graphical user interface provides an icon 1707, indicated as "A" in FIG. 17B, adjacent to the address field 1708 that allows the sender to toggle between anonymous and non-anonymous delivery of messages to the recipient. In an anonymous mode of messaging, the identity of the sender is not disclosed to the recipient receiving the voice message, but the recipient may nonetheless respond via the messaging server 105 that maintains a mapping to enable such dialogs. The graphical user interface also provides a "send" button to transmit the addressed voice messages to the messaging server 105. The graphical user interface provides a "cancel" button 1706, indicated by "X" in FIGS. 17A-17B, to enable the sender to abandon the message recording at any time.

The sender may choose to remain anonymous and issue messages as a "guest" on the website hosted by the web hosting service, or may register and supply, for example, an electronic mail (email) address to maintain an account and store voice message exchanges for a certain period. The email address of the sender is used if targeted recipients choose to respond by email versus choosing to respond with a message back to the messaging server 105. In an embodiment, where the sender desires anonymity, the messaging server 105 may dynamically generate an email address as a proxy for the sender, and then redirect the response message from the recipient to the registered email address of the sender.

The client component 101 transmits 1204 the recorded voice messages, the recipient address or the arbitrary address entered by the sender, and a client identifier associated with the client component 101 to the messaging server 105 via a communication network 104 by pressing the send button on the graphical user interface of the client component 101. On pressing the send button, the client component 101 performs a check for an acceptable address in the address field 1708 exemplarily illustrated in FIG. 17B. In case of an unacceptable address in the address field 1708, the content in the address field 1708 may blink to indicate an unacceptable address. In an embodiment, the graphical user interface of the client component 101 displays "Address Required" to indicate an unacceptable address. When the sender enters an acceptable address in the address field 1708, the client component 101 sends the recorded voice messages to the messaging server 105 along with a client identifier that identifies the client component 101 installed on the sender's computing device 103. The client component 101 posts the voice messages to the messaging server 105 using its own embedded message transport mechanism, regardless of how the voice messages are addressed. In an embodiment, the messaging server 105 stores the recorded voice messages on the messaging server 105. In the case of the anonymous mode of messaging, the messaging server 105 maintains a mapping between the sender and each voice message to enable message routing.

The messaging server 105 resolves 1205 a recipient delivery address based on the arbitrary address entered by the sender for delivering each of the recorded voice messages to the recipient. The recipient delivery address is the target address of the recipient to which the recorded voice messages should be delivered. The resolved recipient delivery address is, for example, the recipient address, a predefined delivery address of the recipient, a predefined electronic mail address of the recipient, a default recipient address, a predefined identification number such as a mobile phone number of the recipient, etc. The resolution triage for resolving the recipient delivery address at the messaging server 105 comprises matching the arbitrary address entered by the sender with the predefined delivery address of the recipient, the predefined electronic mail address of the recipient, the default recipient address, or the predefined identification number of the recipient. The predefined delivery address of the recipient is an address of the recipient maintained on the messaging server 105 or on a separate database management system (DBMS) 402 associated with the messaging server 105. The predefined delivery address refers to a client address of the client component 101' on the recipient's computing device 107. The client address may be a username associated with the client identifier of the client component 101' accessed by the recipient. The predefined electronic mail (email) address of the recipient is, for example, a corporate email address maintained on the messaging server 105. The default recipient address is a default corporate address or another email address of the recipient maintained on the messaging server 105. The messaging server 105 searches for the default recipient address in the absence of a predefined delivery address and a predefined electronic mail address of the recipient that match the arbitrary address entered by the sender. The predefined identification number, for example, a phone number associated with the recipient, is used for sending SMS messages, MMS messages, etc., to the recipient's mobile phone. In an embodiment, the messaging server 105 resolves the recipient delivery address by applying default logic to construct a domain address. For example, on receiving the arbitrary address entered by the sender on the client component 101, the messaging server 105 resolves the recipient delivery address by constructing a domain address, for example, info@xxx.com, where xxx comprises the arbitrary address.

The messaging server 105 transmits 1206 a delivery message comprising one or more of the recorded voice messages to the resolved recipient delivery address. The messaging server 105 transmits the recorded voice messages anonymously or non-anonymously to the recipient. The messaging server 105 sends a notification to the client component 101 accessed via the sender's computing device 103, on transmitting the recorded voice messages to the resolved recipient delivery address. In this embodiment, the messaging server 105 delivers the recorded voice messages to the resolved recipient delivery address as one or more audio file attachments, for example, a waveform audio (WAV) file, an audio interchange file format (AIFF) file, a Windows media audio (WMA) file, etc.

In an embodiment, the messaging server 105 delivers a web address, optional explanatory text, and a session identifier associated with each of the voice messages transmitted to the resolved recipient delivery address. The web address provides a link to the messaging server 105 that enables the recipient to download the client component 101' and retrieve the voice messages. The session identifier allows continuity of the exchange of the voice messages between the sender and the recipient by routing the response messages of the recipient to the sender.

Typically, the client component 101 and 101' accessible by the sender and the recipient respectively are functionally similar. The recipient responds 1207 to the recorded voice messages in the delivery message with one or more response messages. The client component 101' enables the recipient to create or record one or more response messages to respond to the voice messages of the sender. In an embodiment, the recipient transmits the response messages using the client component 101' to the client component 101 used by the sender via the messaging server 105, or to the email address, a predefined identification number, etc., of the sender directly. In case of the anonymous mode of messaging, the response messages are routed via a proxy email address maintained by the messaging server 105.

The recipient electing to respond by email, for example, an auto-responder may send their response messages back to the messaging server 105. The messaging server 105 then either informs the sender that an email response has been received, by displaying an appropriate message using the graphical user interface of the client component 101, if the sender is an anonymous guest, and/or posts the message directly to the account of the sender, if the sender has chosen to register. Subsequent messages follow a similar path, unless the messages are messages associated with the client component 101, in which case the messaging server 105 pushes the messages to the client component 101 of the sender.

Figure 13:
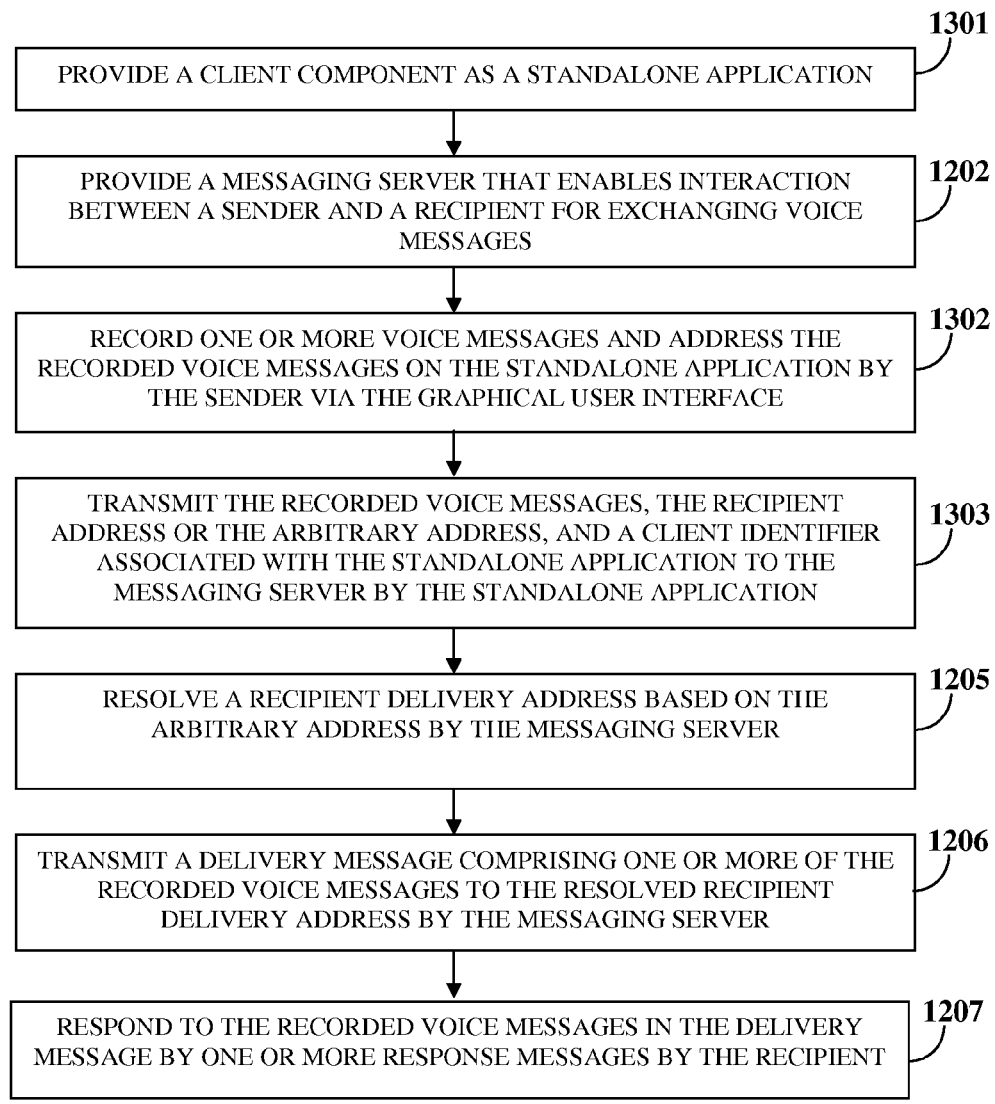
FIG. 13 illustrates an embodiment of the computer implemented method for exchanging voice messages between a sender and a recipient, where a client component is provided as a standalone application.

FIG. 13 illustrates an embodiment of the computer implemented method for exchanging voice messages between a sender and a recipient. In this embodiment, a client component 101, 101' is provided 1301 as a standalone application to the sender and the recipient. As used herein, the standalone application refers to a messaging application such as a voice messaging application provided on a computing device 103 or 107, for example, a personal computer, a mobile device, a cell phone, a personal digital assistant, a tablet computing device, etc., of a sender or a recipient and accessible via the computing device 103 or 107 of the sender or the recipient. In this embodiment, the sender or the recipient is required to download or install the non-browser based application onto the computing device 103 or 107 of the sender or the recipient, but operates functionally similar to the browser based application as exemplarily illustrated in FIGS. 1-2 and FIGS. 10-11 with the exception that the voice messages are not associated with the originating web page 102 information. The standalone application renders a graphical user interface that allows the sender to create, address, and render the voice messages to the recipient.

The messaging server 105 that enables interaction between the sender and the recipient for exchanging the voice messages is also provided 1202. The standalone application enables the sender to record 1302 one or more voice messages and address the recorded voice messages on the standalone application via the graphical user interface. The sender addresses each of the recorded voice messages by entering a recipient address or an arbitrary address on the graphical user interface of the standalone application. The standalone application transmits 1303 the recorded voice messages, the recipient address or the arbitrary address, and a client identifier associated with the standalone application to the messaging server 105. The messaging server 105 resolves 1205 a recipient delivery address based on the arbitrary address for delivering each of the recorded voice messages to the recipient as disclosed in the detailed description of FIG. 12. The messaging server 105 transmits 1206 a delivery message comprising one or more of the recorded voice messages to the resolved recipient delivery address. On the recipient side, the recipient responds 1207 to recorded voice messages in the delivery message with one or more response messages, for example, using a standalone application accessible on the recipient's computing device 107.

Figure 14:
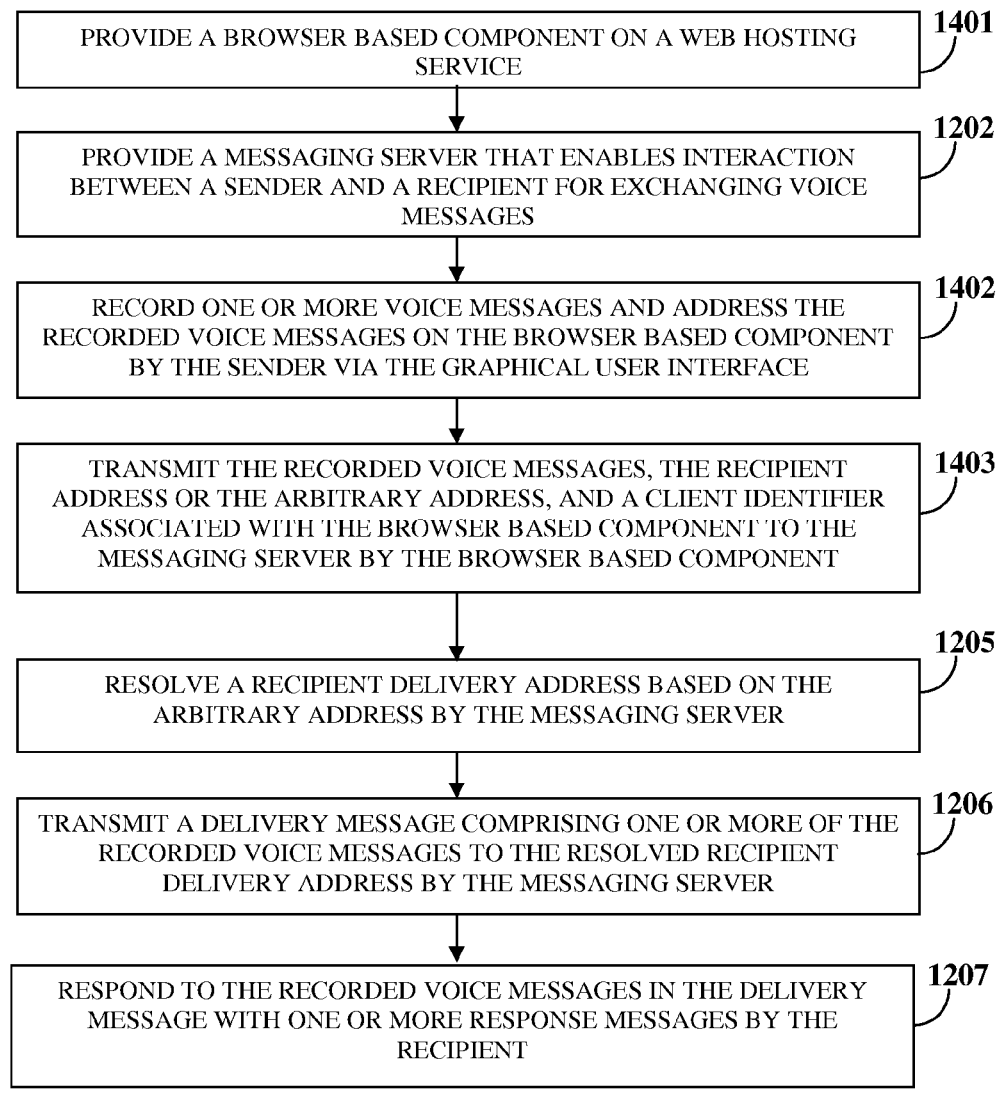
FIG. 14 illustrates an embodiment of the computer implemented method for exchanging voice messages between a sender and a recipient, where a client component is provided as a browser based component on a web hosting service.

FIG. 14 illustrates an embodiment of the computer implemented method for exchanging voice messages between a sender and a recipient. In this embodiment, a browser based component is provided 1401 on a web hosting service to the sender and the recipient. The web hosting service hosts, for example, a website that displays the browser based component, which is accessible over a communication network 104, for example, the internet. As used herein, the browser based component refers to a messaging application such as a voice messaging application provided on the web hosting service and accessible through a web browser, for example, 401, 401' as exemplarily illustrated in FIG. 4. The browser based component does not require the sender or the recipient to download or install non-browser based applications onto a computing device 103 or 107 of the sender or the recipient. The operation of the browser based component is disclosed in the detailed description of FIGS. 1-2 and FIGS. 10-11. The browser based component renders a graphical user interface that allows the sender to create and address the voice messages on the client component enabled web hosting service, and render the voice messages to the recipient.

The messaging server 105 that enables interaction between the sender and the recipient for exchanging the voice messages is also provided 1202. The browser based component enables the sender to record 1402 one or more voice messages and address the recorded voice messages on the browser based component via the graphical user interface. The sender addresses each of the recorded voice messages by entering a recipient address or an arbitrary address on the graphical user interface of the browser based component. The browser based component transmits 1403 the recorded voice messages, the recipient address or the arbitrary address, and a client identifier associated with the browser based component to the messaging server 105. The messaging server 105 resolves 1205 a recipient delivery address based on the arbitrary address for delivering each of the recorded voice messages to the recipient as disclosed in the detailed description of FIG. 12. The messaging server 105 transmits 1206 a delivery message comprising one or more of the recorded voice messages to the resolved recipient delivery address. On the recipient side, the recipient responds 1207 to the recorded voice messages in the delivery message with one or more response messages using the browser based component accessible on the recipient's computing device 107.

Figure 15:
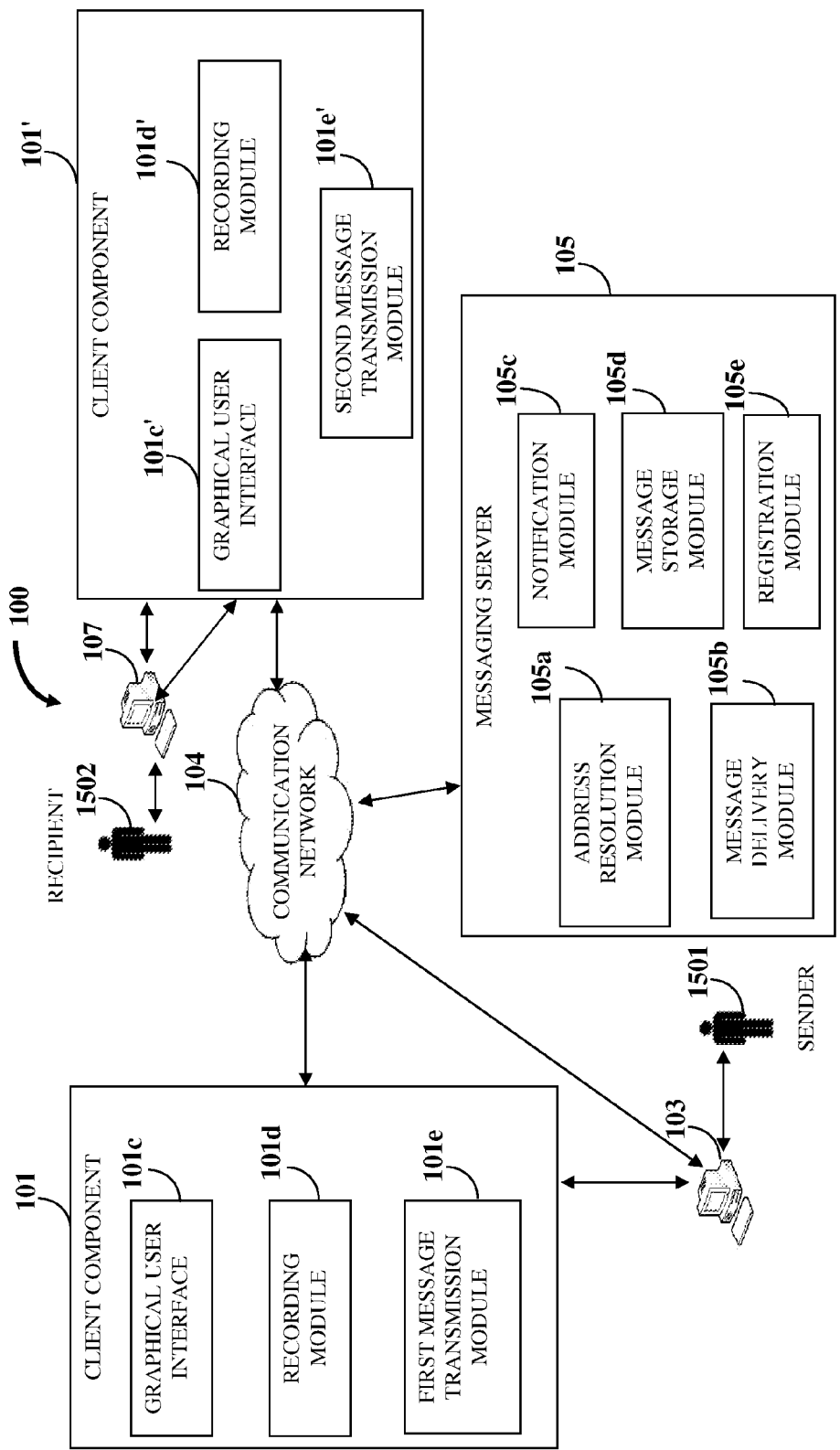
FIG. 15 illustrates a computer implemented system for exchanging voice messages between a sender and a recipient.

FIG. 15 illustrates a computer implemented system 100 for exchanging voice messages between a sender 1501 and a recipient 1502. The computer implemented system 100 disclosed herein comprises a client component 101, 101' provided as a standalone application on a computing device 103 and 107 of the sender 1501 and the recipient 1502, or as a browser based application provided on a web hosting service accessible over a communication network 104, and a messaging server 105. The client component 101 on the sender's 1501 computing device 103 comprises a graphical user interface (GUI) 101c, a recording module 101d, and a first message transmission module 101e. The GUI 101c allows the sender 1501 to create, address, and render voice messages to the recipient 1502. The recording module 101d records one or more voice messages created by the sender 1501. The first message transmission module 101e transmits each of the recorded voice messages, a recipient address or an arbitrary address entered by the sender 1501 on the GUI 101c of the client component 101, and a client identifier associated with the client component 101 to the messaging server 105.

The messaging server 105 is in communication with the client component 101 accessible via the sender's 1501 computing device 103, and the client component 101' accessible via the recipient's 1502 computing device 107, via the communication network 104. The communication network 104 is, for example, a local area network (LAN), a wide area network, a mobile communication network, etc. The messaging server 105 comprises a registration module 105e, an address resolution module 105a, a message delivery module 105b, a notification module 105c, and a message storage module 105d. The registration module 105e registers the sender 1501 with the messaging server 105 for maintaining an account for sending the recorded voice messages to the recipient 1502 and receiving the response messages from the recipient 1502. The registration module 105e also registers the recipient's 1502 address with the messaging server 105 for subsequent message exchanges. The message storage module 105d stores the recorded voice messages of the sender 1501 on the messaging server 105. In an embodiment, the message storage module 105d generates a mapping between each stored voice message and the client identifier or username of the originating sender 1501.

The address resolution module 105a resolves a recipient delivery address based on the arbitrary address entered by the sender 1501 on the GUI 101c of the client component 101 for delivering each of the recorded voice messages to the recipient 1502. The resolved recipient delivery address is, for example, a recipient address, a predefined delivery address of the recipient 1502, a predefined electronic mail address of the recipient 1502, a default recipient address, a predefined identification number of the recipient 1502, etc. The address resolution module 105a resolves the recipient delivery address based on the arbitrary address by matching the arbitrary address with the predefined delivery address of the recipient 1502, matching the arbitrary address with the predefined electronic mail address or the predefined identification number of the recipient 1502, or matching the arbitrary address with the default recipient address.

The message delivery module 105b transmits a delivery message comprising one or more of the recorded voice messages to the resolved recipient delivery address to allow the recipient 1502 to respond to the recorded voice messages in the delivery message with one or more response messages. The notification module 105c sends a notification to the client component 101 accessed via the computing device 103 of the sender 1501, on transmitting the recorded voice messages to the resolved recipient delivery address through the GUI 101c of the client component 101. The notification module 105c also notifies the sender 1501 on inability to match the arbitrary address with the recipient address, the predefined delivery address of the recipient 1502, the predefined electronic mail address of the recipient 1502, or the predefined identification number of the recipient 1502.

The client component 101' accessible via the computing device 107 of the recipient 1502 comprises a GUI 101c', a recording module 101d', and a second message transmission module 101e'. The GUI 101c' allows the recipient 1502 to create, address, and render response messages to the sender 1501. The recording module 101d' records one or more response messages created by the recipient 1502. The second message transmission module 101e' transmits one or more response messages to an electronic mail address of the sender 1501, a predefined identification number of the sender 1501, or the client component 101 of the sender 1501 via the messaging server 105. The message storage module 105d stores the response messages of the recipient 1502 on the messaging server 105.

Figure 16:
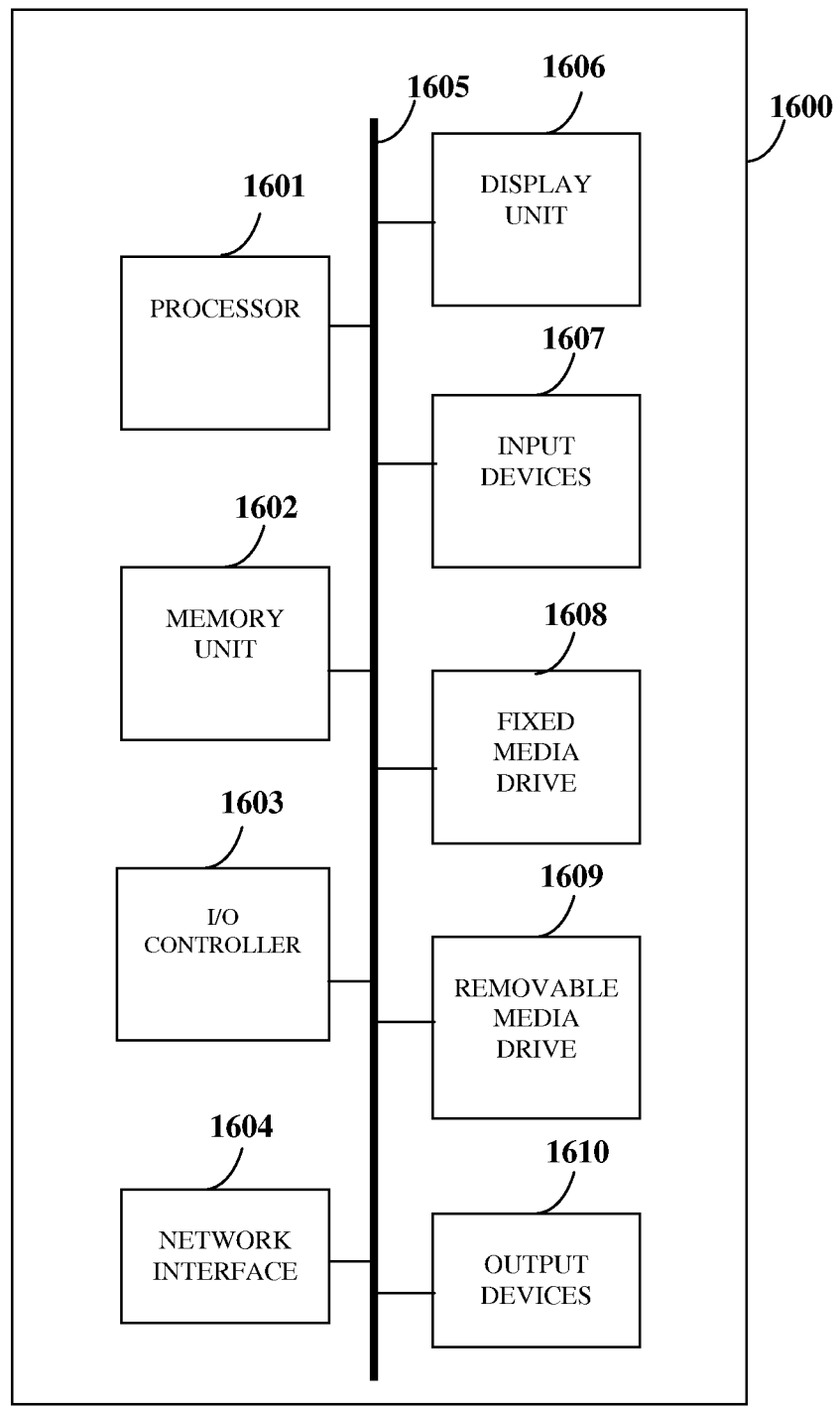
FIG. 16 exemplarily illustrates the architecture of a computer system employed for exchanging voice messages between a sender and a recipient.

FIG. 16 exemplarily illustrates the architecture of a computer system 1600 employed for exchanging voice messages between a sender 1501 and a recipient 1502. In an embodiment, the client component 101, 101' and the messaging server 105 of the computer implemented system 100 disclosed herein employs the architecture of the computer system 1600 exemplarily illustrated in FIG. 16. In an embodiment, the client component 101, 101' is deployed on the computer system 1600 as a standalone application. In another embodiment, the client component 101, 101' is deployed as a browser based component accessible by a browser application via the computer system 1600. The sender 1501 transmits the recorded voice messages from the client component 101 to the messaging server 105 via a communication network 104, for example, a short range network or a long range network. The computer system 1600 comprises, for example, a processor 1601, a memory unit 1602 for storing programs and data, an input/output (I/O) controller 1603, a network interface 1604 that may access wireless networks, for example, the communication network 104, a data bus 1605, a display unit 1606, input devices 1607, output devices 1610, etc.

The processor 1601 is an electronic circuit that executes computer programs. The memory unit 1602 is used for storing programs, applications, and data. The client component 101, 101' is stored on the memory unit 1602 or the drives 1608 or 1609 of the computer system 1600. The memory unit 1602 is, for example, a random access memory (RAM) or another type of dynamic storage device that stores information and instructions for execution by the processor 1601. The memory unit 1602 also stores temporary variables and other intermediate information used during execution of the instructions by the processor 1601. The computer system 1600 further comprises a read only memory (ROM) or another type of static storage device that stores static information and instructions for the processor 1601. The network interface 1604 enables connection of the computer system 1600 to the communication network 104. The computer system 1600 communicates with other computer systems, for example, through the network interface 1604. The network interface 1604 is, for example, an infrared (IR) interface, a WiFi interface, a universal serial bus interface (USB), a local area network (LAN) interface, a wide area network (WAN) interface, etc. The I/O controller 1603 controls the input actions of the sender 1501 on the graphical user interface (GUI) 101c, for example, entering an arbitrary address on the GUI 101c, etc., and output actions of the GUI 101c. The data bus 1605 permits communications between the modules, for example, 101c, 101d, 101e, 101c', 101d', 101e', etc., of the client component 101, 101' deployed on the computer system 1600. The data bus 1605 also permits communications between the modules, for example, 105a, 105b, 105c, 105d, and 105e of the messaging server 105.

The display unit 1606 displays, via the GUI 101c, the results of the recording module 101d, and the first message transmission module 101e, or the address resolution module 105a, the message delivery module 105b, and the notification module 105c to the sender 1501. The input devices 1607 are used for inputting data into the computer system 1600. The input devices 1607 are, for example, a keyboard such as an alphanumeric keyboard, a joystick, a mouse, a touch pad, a light pen, a microphone, etc. The output device 1610, for example, speakers output the voice messages for review by the sender 1501 or the recipient 1502.

The computer system 1600 further comprises a fixed media drive 1608 and a removable media drive 1609 for receiving removable media. Computer applications and programs are used for operating the computer system 1600. The programs are loaded onto the fixed media drive 1608 and into the memory unit 1602 of the computer system 1600 via the removable media drive 1609, or the network interface 1604. In an embodiment, the computer applications and programs may be loaded directly through the network 104. Computer applications and programs are executed by double clicking a related icon displayed on the display unit 1606 using one of the input devices 1607. The sender 1501 interacts with the computer system 1600 via the GUI 101c using the display unit 1606.

The computer system 1600 employs an operating system for performing multiple tasks. The operating system is responsible for management and coordination of activities and sharing of the resources of the computer system 1600. The operating system further manages security of the computer system 1600, peripheral devices connected to the computer system 1600, and network connections. The operating system employed on the computer system 1600 recognizes, for example, inputs provided by the sender 1501 using one of the input devices 1607, the output display, files and directories stored locally on the fixed media drive 1608, for example, a hard drive, etc. The operating system on the computer system 1600 executes different programs, for example, a web browser 401, 401', an electronic mail application, etc., initiated by the sender 1501 or the recipient 1502 using the processor 1601.

Instructions for executing the modules 101c, 101d, and 101e, the modules 101c', 101d', and 101e', and the modules 105a, 105b, 105c, 105d, and 105e of the client component 101, the client component 101', and the messaging server 105 respectively are retrieved by the processor 1601 from the program memory in the form of signals. A program counter (PC) determines locations of the instructions in the program memory. The program counter stores a number that identifies the current position in the program of the modules 101c, 101d, and 101e, the modules 101c', 101d', and 101e', and the modules 105a, 105b, 105c, 105d, and 105e of the client component 101, the client component 101', and the messaging server 105 respectively.

The instructions fetched by the processor 1601 from the program memory after being processed are decoded. The instructions are placed in an instruction register (IR) in the processor 1601. After processing and decoding, the processor 1601 executes the instructions. For example, the GUI 101c of the sender's 1501 client component 101 defines instructions for allowing the sender 1501 to create, address, and render the voice messages to the recipient 1502. The recording module 101d of the client component 101 defines instructions for recording one or more voice messages. The first message transmission module 101e of the client component 101 defines instructions for transmitting the recorded voice messages, the recipient address or the arbitrary address, and a client identifier associated with the client component 101 to the messaging server 105. The registration module 105e of the messaging server 105 defines instructions for registering the sender 1501 with the messaging server 105 for maintaining an account for sending the recorded voice messages to the recipient 1502 and receiving the response messages from the recipient 1502. The message storage module 105d of the messaging server 105 defines instructions for storing the recorded voice messages and the response messages on the messaging server 105. The address resolution module 105a of the messaging server 105 defines instructions for resolving the recipient delivery address based on the arbitrary address for delivering each of the recorded voice messages to the recipient 1502. The message delivery module 105b of the messaging server 105 defines instructions for transmitting a delivery message comprising the recorded voice messages to the resolved recipient delivery address. The notification module 105c of the messaging server 105 defines instructions for notifying the sender 1501 on transmitting the voice messages to the resolved recipient delivery address. The GUI 101c' of the recipient's 1502 client component 101' defines instructions for allowing the recipient 1502 to create, address, and render the response messages to the sender 1501. The recording module 101d' of the client component 101' defines instructions for recording one or more response messages. The second message transmission module 101e' of the client component 101' defines instructions for transmitting one or more response messages to an electronic mail address of the sender 1501, a predefined identification number of the sender 1501 or the client component 101 of the sender 1501 via the messaging server 105.

The processor 1601 executing the client component 101 on the sender's 1501 computing device 103 retrieves the instructions defined by the GUI 101c, the recording module 101d, and the first message transmission module 101e, and executes the instructions. The processor 1601 executing the client component 101' on the recipient's 1502 computing device 107 retrieves the instructions defined by the GUI 101c', the recording module 101d', and the second message transmission module 101e', and executes the instructions. The processor 1601 of the messaging server 105 retrieves the instructions defined by the registration module 105e, the message storage module 105d, the address resolution module 105a, the message delivery module 105b, and the notification module 105c, and executes the instructions.

At the time of execution, the instructions stored in the instruction register are examined to determine the operations to be performed. The operations include arithmetic and logic operations. The processor 1601 then performs the specified operation. The operating system performs multiple routines for performing a number of tasks required to assign the input devices 1607, the output devices 1610, and memory for execution of the modules 101c, 101d, and 101e of the client component 101, the modules 101c', 101d', and 101e' of the client component 101', and the modules 105a, 105b, 105c, 105d, and 105e of the messaging server 105. The tasks performed by the operating system comprise, for example, assigning memory to the modules 101c, 101d, and 101e of the client component 101, the modules 101c', 101d', and 101e' of the client component 101', and the modules 105a, 105b, 105c, 105d, and 105e of the messaging server 105, moving data between the memory unit 1602 and disk units, and handling input/output operations. The operating system performs the tasks, on request, by the operations and after performing the tasks, the operating system transfers the execution control back to the processor 1601. The processor 1601 continues the execution to obtain one or more outputs. The outputs of the execution of the modules 101c, 101d, and 101e of the client component 101 are displayed to the sender 1501. The outputs of the execution of the modules 101c', 101d', and 101e' of the client component 101' are displayed to the recipient 1502. The outputs of the execution of the modules 105a, 105b, 105c, 105d, and 105e of the messaging server 105 are displayed, for example, to a system administrator.

Disclosed herein is a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 1601, except for a transitory, propagating signal.

The computer program product disclosed herein comprises multiple computer program codes for exchanging voice messages between a sender 1501 and a recipient 1502. For example, the computer program product disclosed herein comprises computer program codes for providing a client component 101, 101' to the sender 1501 and the recipient 1502, recording one or more voice messages and addressing the recorded voice messages on the client component 101, transmitting the recorded voice messages, the recipient address or the arbitrary address, and a client identifier associated with the client component 101 by the client component 101 to the messaging server 105, resolving a recipient delivery address based on the arbitrary address by the messaging server 105, transmitting a delivery message comprising one or more of the recorded voice messages by the messaging server 105 to the resolved recipient delivery address, and responding to the recorded voice messages in the delivery message by the recipient 1502 with one or more response messages. The computer program codes for resolving the recipient delivery address based on the arbitrary address match the arbitrary address with the predefined delivery address of the recipient 1502, the predefined electronic mail address of the recipient 1502, the predefined identification number of the recipient 1502, and the default recipient address for determining the recipient delivery address. The computer program product disclosed herein further comprises additional computer program codes for performing additional steps that may be required and contemplated for exchanging voice messages between the sender 1501 and one or more recipients 1502 using the messaging server 105.

The computer program codes comprising the computer executable instructions are embodied on the non-transitory computer readable storage medium. The processor 1601 of the computer system 1600 retrieves these computer executable instructions and executes them. When the computer executable instructions embodied on the non-transitory computer readable storage medium are executed by the processor 1601, the computer executable instructions cause the processor 1601 to perform the method steps for exchanging voice messages between the sender 1501 and the recipient 1502. In an embodiment, a single piece of computer program code comprising computer executable instructions performs one or more steps of the computer implemented method disclosed herein for exchanging voice messages between the sender 1501 and the recipient 1502.

For purposes of illustration, the detailed description refers to each of the client component 101, the client component 101', and the messaging server 105 being run locally on a computer system 1600; however the scope of the computer implemented method and system 100 disclosed herein is not limited to each of the client component 101, the client component 101', and the messaging server 105 being run locally on the computer system 1600 via the operating system and the processor 1601, but may be extended to run remotely over the network 104 by employing a web browser and a remote server, a mobile phone, or other electronic devices.

FIGS. 17A-17B exemplarily illustrate the graphical user interface (GUI) 101c of the client component 101 for recording and sending voice messages. Once installed, the client component 101 displays a message on the screen 1701 of the GUI 101c stating that the client component 101 is ready for use. The client component 101 enables the sender 1501 to record a voice message using the record button 1702. The client component 101 enables the sender 1501 to control playback of voice messages using the playback buttons 1704a and 1704b. The playback of the voice message received from the recipient 1502, for example, an agent is controlled using the playback button 1704a. The playback of previously received voice messages may be controlled using button 1704b. The recorded voice message can be reviewed by pressing the review button 1703a. Previously recorded voice messages may be reviewed using the review button 1703b.

The client component 101 enables the sender 1501 to transmit the recorded voice message using the send button 1705 to the messaging server 105. Prior to transmission, the recorded voice messages may be temporarily stored in a message buffer of the client component 101. The sender 1501 may enter a recipient address in the address field 1708 of the GUI 101c as exemplarily illustrated in FIG. 17B. In embodiment, the client component 101 allows the sender 1501 to anonymously transmit a message to the recipient 1502 by using the toggle button "A" 1707. FIG. 17A exemplarily illustrates a standard version of the GUI 101c of the client component 101 in which addressing is not required, while FIG. 17B exemplarily illustrates an addressable version of the GUI 101c of the client component 101 in which addressing is required. The GUI 101c also enables the sender 1501 to cancel a recorded voice message and/or clear the message buffer by pressing the cancel button 1706. The sender 1501 may cancel the message at any time before the transmission of one or more of the voice messages.

Figure 18A:
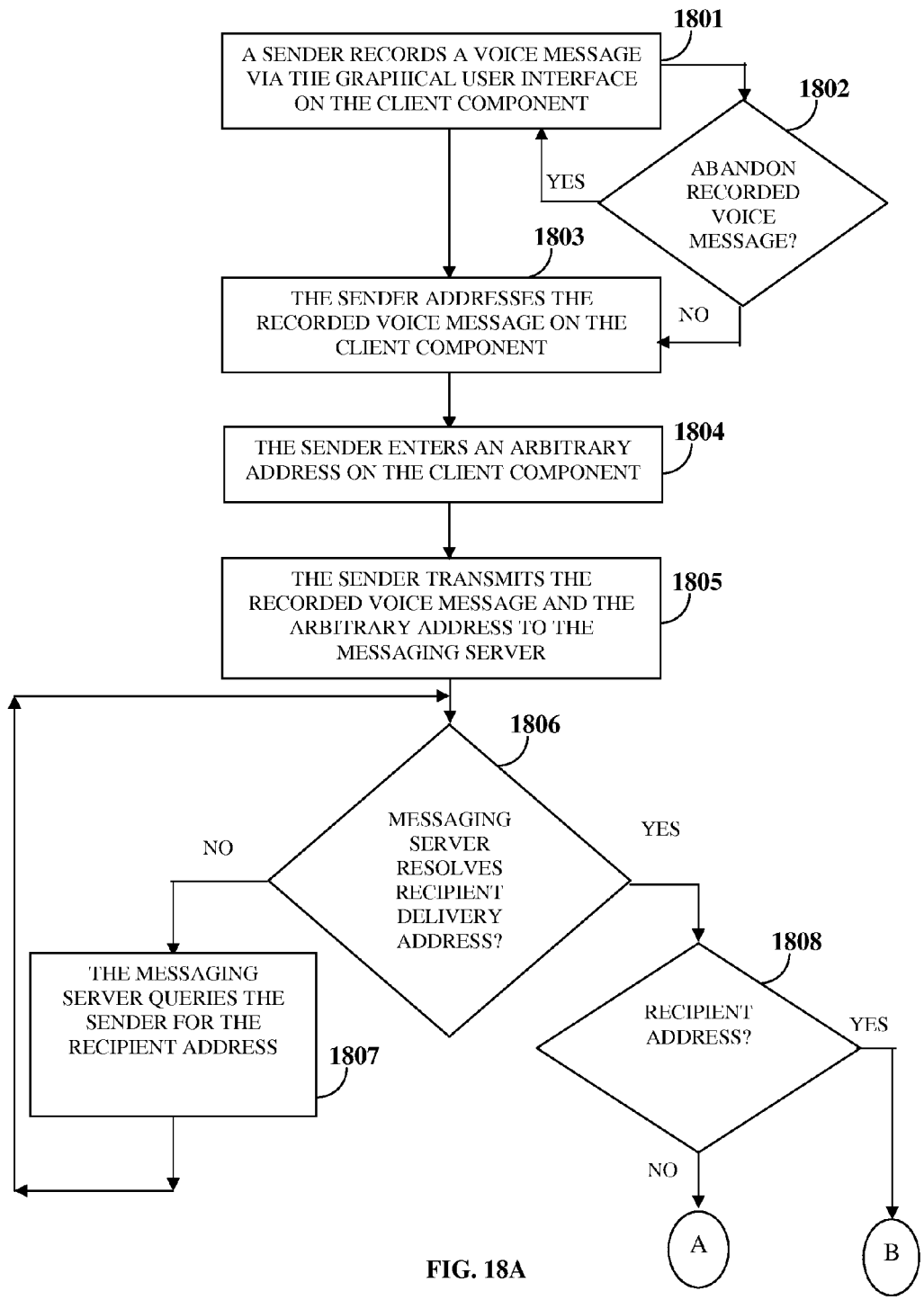
FIGS. 18A-18C exemplarily illustrate a flow diagram for recording voice messages on the client component and delivering the recorded voice messages by resolving a recipient delivery address by the messaging server.
Figure 18B:
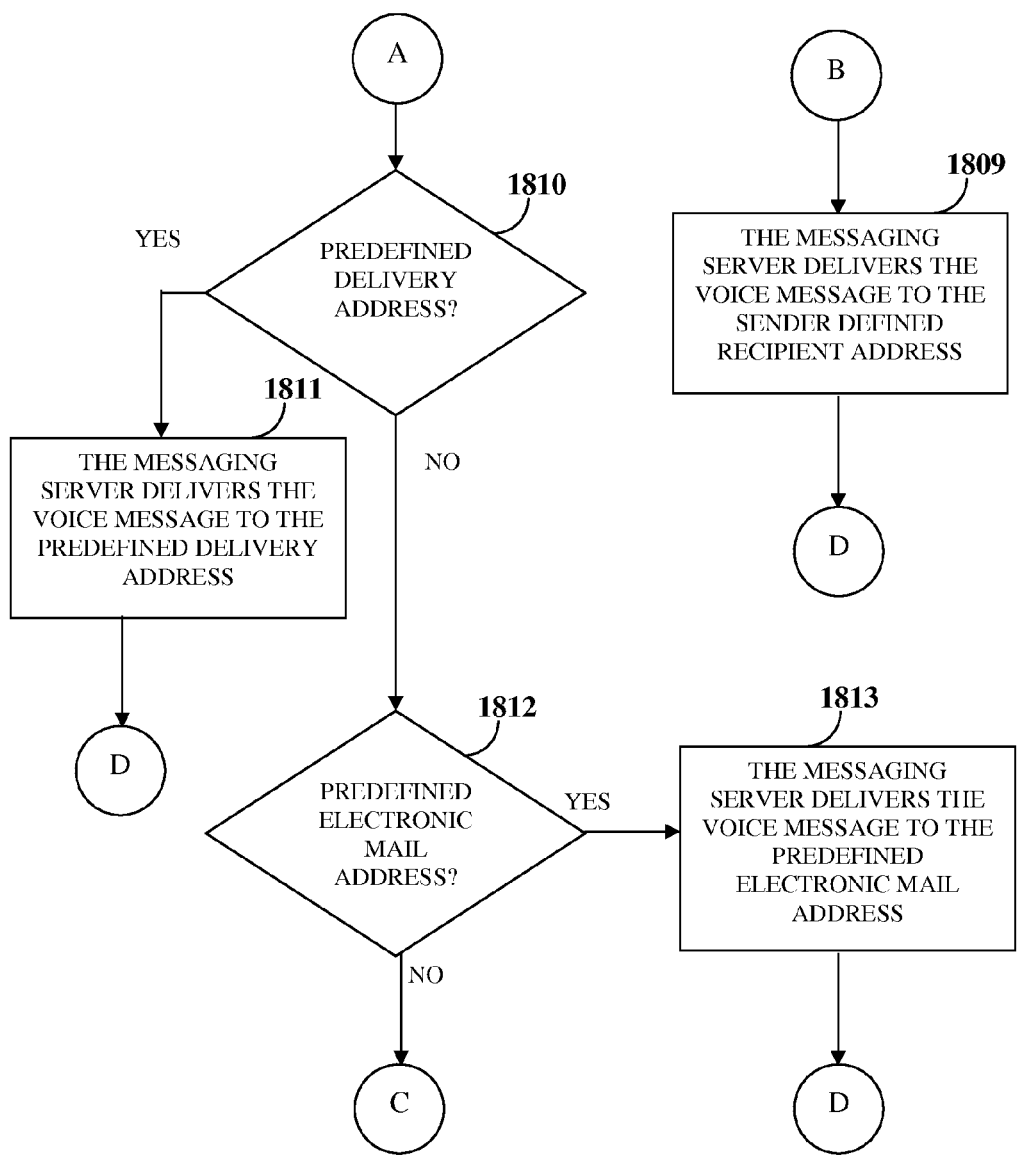
Figure 18C:
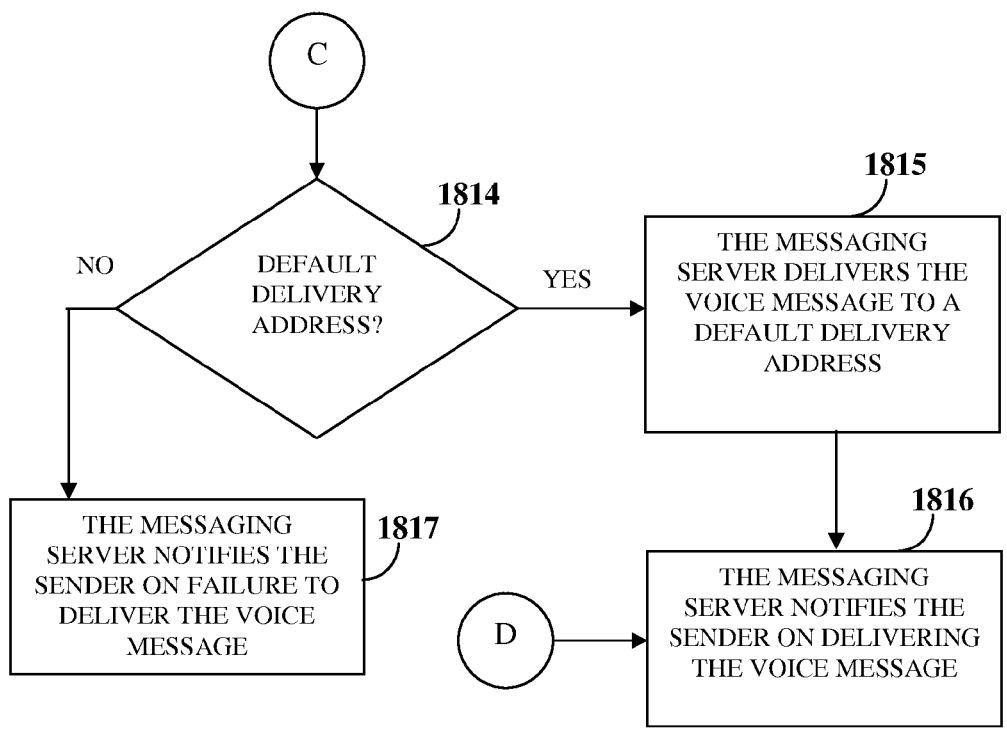

FIGS. 18A-18C exemplarily illustrate a flow diagram for recording voice messages on the client component 101 and delivering the recorded voice messages by resolving a recipient delivery address by the messaging server 105. A sender 1501 records 1801 a voice message via the graphical user interface (GUI) 101c on the client component 101. The recorded voice message may be temporarily stored in the message buffer of the client component 101. If the sender 1501 wishes to abandon 1802 the recorded voice message, the client component 101 clears the recorded voice message from the message buffer and enables the sender 1501 to record a new voice message. If the sender 1501 wishes to proceed with the recorded voice message, the sender 1501 addresses 1803 the recorded voice message on the client component 101. The sender 1501 enters 1804 an arbitrary address on the client component 101. The sender 1501 transmits 1805 the recorded voice message and the arbitrary address to the messaging server 105.

The messaging server 105 attempts to resolve 1806 a valid recipient delivery address based on the arbitrary address. If the messaging server 105 cannot not parse the arbitrary address entered by the sender 1501 or is not able to resolve the arbitrary address to a valid recipient delivery address, the messaging server 105 queries 1807 the sender 1501 to enter a recipient address or a different recipient address and attempts 1806 to resolve the recipient delivery address based on the entered recipient address.

For resolving the recipient delivery address, the messaging server 105 determines 1808 whether the arbitrary address matches a recipient address. If the messaging server 105 matches the arbitrary address the recipient address, then the messaging server 105 delivers 1809 the voice message to the recipient address. If the arbitrary address does not match the recipient address, the messaging server 105 determines 1810 whether the arbitrary address matches a predefined delivery address maintained on the messaging server 105, for example, a username associated with the recipient's 1502 client component 101'. If the arbitrary address matches the recipient's 1502 predefined delivery address, then the messaging server 105 delivers 1811 the voice message to the predefined delivery address. If the arbitrary address does not match the predefined delivery address, then the messaging server 105 determines 1812 whether the arbitrary address matches the recipient's 1502 predefined electronic mail address, for example, a corporate email address maintained on the messaging server 105. If the arbitrary address matches the predefined electronic mail address, then the messaging server 105 delivers 1813 the voice message to the predefined electronic mail address. If the arbitrary address does not match the predefined electronic mail address, then the messaging server 105 determines 1814 whether the arbitrary address matches a default delivery address. If the arbitrary address matches the default delivery address, the messaging server 105 delivers 1815 the voice message to the default delivery address.

The messaging server 105 notifies 1816 the sender 1501 on successfully delivering the voice message to the recipient 1502. However, if the messaging server 105 is not able to resolve the arbitrary address to any valid recipient delivery address, the messaging server 105 notifies 1817 the sender 1501 that the message delivery attempts were not successful and therefore failed.

Consider an example of exchanging voice messages between a sender 1501 and a recipient 1502. The sender 1501 registers with the messaging server 105 by providing the sender's 1501 electronic mail address and the sender's 1501 phone number. The sender 1501 downloads the client component 101 as a standalone application on the sender's 1501 computing device 103, for example, a mobile phone. The sender 1501 installs the client component 101 on the sender's computing device 103. The graphical user interface (GUI) 101c of the client component 101 displays a message stating that the client component 101 is ready for use. The sender 1501 presses the record button 1702 on the GUI 101c, as exemplarily illustrated in FIGS. 17A-17B, to initiate recording of a voice message on the client component 101 and records the voice message on the client component 101. The sender 1501 presses the review button 1703a on the client component 101 to review the recorded voice message.

The sender 1501 taps the address field 1708 on the GUI 101c of the client component 101. The client component 101 shows a list of popular target addresses in the address field 1708. The sender 1501 enters a recipient's 1502 name as "enterprise1" in the address field 1708. The recipient 1502 "enterprise1" is not in the list of popular target addresses. The sender 1501 uses the option to keep the sender's 1501 name as anonymous. The sender 1501 presses the send button 1705 on the GUI 101c to transmit the recorded voice message to the messaging server 105. The client component 101 transmits the recorded voice message to the messaging server 105.

The messaging server 105 stores the recorded voice message on the messaging server 105. The messaging server 105 attempts to resolve the name of the recipient 1502 to an address associated with the recipient 1502 stored on the messaging server 105. The messaging server 105 attempts to match "enterprise1" with a predefined recipient delivery address. The messaging server 105 stores registered recipient delivery addresses, for example, "enterprise1A", "enterprise1B", "enterprise1C", etc. The messaging server 105 is unable to match "enterprise1" with a recipient delivery address on the messaging server 105. The messaging server 105 then attempts to match "enterprise1" with an electronic mail address stored on the messaging server 105. The messaging server 105 stores registered electronic mail addresses, for example, "abc@enterprise1A.com", "def@enterprise1B.com", "ghi@enterprise1C.com". The messaging server 105 is unable to match "enterprise1" with the electronic mail addresses stored on the messaging server 105. The messaging server 105 then attempts to match "enterprise1" with a default electronic mail address by accessing the website of "enterprise1" and identifying an electronic mail address associated with "enterprise1" on the website of "enterprise1". The messaging server 105 is unable to match "enterprise1" with the default electronic mail address associated with "enterprise1". The messaging server 105 sends a notification, for example, "unable to deliver the message" to the client component 101 of the sender 1501 on failure to resolve the recipient delivery address and deliver the voice message to the recipient 1502.

The sender 1501 then enters a more specific address, for example, "enterprise1A" in the address field 1708 of the GUI 101c of the client component 101 to send the recorded voice message to the recipient 1502. The messaging server 105 attempts to match "enterprise1A" with a recipient delivery address. The messaging server 105 matches "enterprise1A" with the recipient delivery address on the messaging server 105. The messaging server 105 delivers the recorded voice message to the client component 101' of the recipient 1502 having the recipient delivery address as "enterprise1A". The messaging server 105 sends a notification, for example, "message delivered" to the sender's 1501 client component 101. Enterprise 1A then responds to the recorded voice message by recording a response message using the client component 101' on the recipient's 1502 computing device 107 and transmitting the response message to the sender's 1501 client component 101 via the messaging server 105. The recipient 1502 may also send the response message, for example, via electronic mail using the sender's 1501 electronic mail address or via SMS using the sender's 1501 phone number.

Consider another example of exchanging voice messages between a sender 1501 and a recipient 1502. The sender 1501 registers with the messaging server 105 and provides the sender's 1501 electronic mail address. The sender 1501 accesses the client component 101 as a browser based application on a web hosting service. The graphical user interface (GUI) 101c of the client component 101 displays a message stating that the client component 101 is ready for use. The sender 1501 presses the record button 1702, as exemplarily illustrated in FIGS. 17A-17B, to initiate recording a voice message on the client component 101 and records the voice message on the client component 101. The sender 1501 presses the review button 1703a on the client component 101 to review the recorded voice message. The sender 1501 enters the name of a recipient 1502 as "enterprise2" in the address field 1708 on the GUI 101c of the client component 101 and uses the option to keep the sender's 1501 name as non-anonymous. The sender 1501 presses the send button 1705 to transmit the recorded voice message to the messaging server 105. The client component 101 transmits the recorded voice message to the messaging server 105.

The messaging server 105 stores the recorded voice message on the messaging server 105. The messaging server 105 attempts to resolve the name of the recipient 1502 to an address associated with the recipient 1502 stored on the messaging server 105. The messaging server 105 stores registered recipient delivery addresses, for example, "enterprise1A", "enterprise1B", "enterprise1C", etc. The messaging server 105 attempts to match "enterprise2" with a recipient delivery address. The messaging server 105 is unable to match "enterprise2" with the recipient delivery address. The messaging server 105 then attempts to match "enterprise2" with an electronic mail address stored on the messaging server 105. The messaging server 105 stores registered electronic mail addresses, for example, "abc@enterprise1A.com", "def@enterprise1B.com", "ghi@enterprise1C.com". The messaging server 105 is unable to match "enterprise2" to an electronic mail address stored on the messaging server 105. The messaging server 105 attempts to match "enterprise2" with a default electronic mail address by applying default logic to construct a domain address info@xxx.com, where xxx in this case would become enterprise2. The messaging server 105 transmits the recorded voice message to "info@enterprise2.com". The messaging server 105 sends a notification to the client component 101 of the sender 1501 on delivering the recorded voice message to the default electronic mail address of the recipient 1502. If this posting is not successful, messaging server 105 forwards a failure message to the sender 1501. The recipient 1502 otherwise responds to the electronic mail message with a response message to the electronic mail address of the sender 1501. The response message is transmitted directly to the electronic mail address of the sender 1501.

Given the architecture of address resolution and anonymity, it should be apparent that various combinations of address resolution and anonymity are possible, and those expressed here are merely representative, and not exhaustive, of the various embodiments possible.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, processor cache, a random access memory (RAM), etc. Transmission media comprise, for example, coaxial cables, copper wire and fiber optics, including the wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as an object code. The computer program product disclosed herein comprises computer executable instructions embodied in a non-transitory computer readable storage medium, wherein the computer program product comprises computer program codes for implementing the processes of various embodiments.

The present invention can be configured to work in a network environment including a computer that is in communication, via a communications network, with one or more devices. The computer may communicate with the devices directly or indirectly, via a wired or wireless medium such as the internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc. that are adapted to communicate with the computer. Any number and type of machines may be in communication with the computer.

As to a further discussion of the manner of usage and operation of the present invention, the same should be apparent from the above description. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for sending voice messages from a sender to a recipient, comprising:
   providing a client component, said client component rendering a graphical user interface;
   providing a messaging server that enables interaction between said sender and said recipient for said exchanging of said voice messages;
   receiving inputs from said sender for recording one or more of said voice messages on said client component;
   receiving inputs for addressing said recorded one or more voice messages on said client component, wherein said inputs received for addressing each of said recorded one or more voice messages comprises one of a recipient address and an arbitrary address;
   transmitting said recorded one or more voice messages, said one of said recipient address and said arbitrary address, and a client identifier associated with said client component to said messaging server via a communication network;
   resolving, at said messaging server, a recipient delivery address based on said recipient address or said arbitrary address for delivering each of said recorded one or more voice messages to said recipient, wherein said resolved recipient delivery address is one of said recipient address, a predefined delivery address of said recipient, a predefined electronic mail address of said recipient, a default recipient address, and a predefined identification number of said recipient; and
   transmitting, from said messaging server, a delivery message comprising one or more of said recorded one or more voice messages to said resolved recipient delivery address.

2. The computer implemented method of claim 1, wherein said client component is one of a standalone application provided on a computing device of said sender and said recipient, and a browser based application provided on a web hosting service.

3. The computer implemented method of claim 1 further comprises responding to said one or more of said recorded one or more voice messages in said delivery message with one or more response messages, wherein said one or more response messages are transmitted to one of an electronic mail address of said sender, a predefined identification number of said sender, and said client component of said sender via said messaging server by said recipient using said client component accessed via a computing device of said recipient.

4. The computer implemented method of claim 1, wherein said delivery message further comprises a web address, optional explanatory text, and a session identifier, wherein said web address provides a link that allows said recipient to download said client component from said messaging server, and wherein said session identifier allows continuity of said exchange of said voice messages between said sender and said recipient by routing said one or more response messages of said recipient to said sender.

5. The computer implemented method of claim 1, further comprising storing said recorded one or more voice messages on said messaging server.

6. The computer implemented method of claim 1, wherein said recorded one or more voice messages are anonymously transmitted to said recipient via said messaging server.

7. The computer implemented method of claim 1, wherein said recorded one or more voice messages are non-anonymously transmitted to said recipient via said messaging server.

8. The computer implemented method of claim 1, wherein said transmission of said delivery message from said messaging server comprises one of:
   delivering said recorded one or more voice messages as one or more audio file attachments to said resolved recipient delivery address; and
   delivering a web address and a session identifier associated with said recorded one or more voice messages to said resolved recipient delivery address, wherein said web address provides a link to said messaging server for downloading said client component and retrieving said recorded one or more voice messages, and wherein said session identifier allows continuity of said exchange of said voice messages between said sender and said recipient by routing one or more response messages of said recipient to said sender.

9. The computer implemented method of claim 1, further comprising registering said sender with said messaging server for maintaining an account for sending said recorded one or more voice messages to said recipient and receiving one or more response messages from said recipient.

10. The computer implemented method of claim 1, wherein said resolving of said recipient delivery address based on said arbitrary address comprises one or more of:
   matching said arbitrary address with a predefined delivery address of said recipient;

matching said arbitrary address with one of a predefined electronic mail address and a predefined identification number of said recipient; and matching said arbitrary address with a default recipient address.

11. The computer implemented method of claim 1, further comprising sending a notification to said client component accessed via a computing device of said sender on transmitting said recorded one or more voice messages to said resolved recipient delivery address by said messaging server.

12. A computer implemented system for sending voice messages from a sender to a recipient, comprising:

a client component comprising:
 a graphical user interface that receives inputs from said sender to create, address, and render said voice messages to said recipient;
 a recording module that records one or more of said voice messages; and
 a first message transmission module that transmits said recorded one or more voice messages, one of a recipient address and an arbitrary address received by said client component, and a client identifier associated with said client component to a messaging server; and said messaging server in communication with said client component via a communication network, wherein said messaging server comprises:
 an address resolution module that resolves a recipient delivery address based on said arbitrary address for delivering each of said recorded one or more voice messages to said recipient, wherein said address resolution module resolves said recipient delivery address based on said arbitrary address by performing one or more of:
  matching said arbitrary address with a predefined delivery address of said recipient;
  matching said arbitrary address with one of a predefined electronic mail address and a predefined identification number of said recipient; and
  matching said arbitrary address with a default recipient address;
 a message delivery module that transmits a delivery message comprising one or more of said recorded one or more voice messages to said resolved recipient delivery address.

13. The computer implemented system of claim 12, wherein said client component is one of a standalone application provided on a computing device of said sender and said recipient, and a browser based application provided on a web hosting service.

14. The computer implemented system of claim 12, wherein said client component accessible via a computing device of said recipient comprises a second message transmission module that transmits one or more response messages of said recipient to one of an electronic mail address of said sender, a predefined identification number of said sender, and said client component of said sender via said messaging server.

15. The computer implemented system of claim 12, wherein said messaging server further comprises a message storage module that stores said recorded one or more voice messages.

16. The computer implemented system of claim 12, wherein said messaging server further comprises a notification module that sends a notification to said client component accessed via a computing device of said sender on transmitting said recorded one or more voice messages to said resolved recipient delivery address.

17. The computer implemented system of claim 12, wherein said messaging server further comprises a registration module that registers said sender with said messaging server for maintaining an account for sending said recorded one or more voice messages to said recipient and receiving one or more response messages from said recipient.

18. A computer program product comprising computer executable instructions embodied in a non-transitory computer readable storage medium, wherein said computer program product comprises computer program codes for:

providing a client component, said client component rendering a graphical user interface;

receiving inputs from said sender for recording one or more of said voice messages on said client component;

receiving inputs for addressing said recorded one or more voice messages on said client component, wherein said inputs received for addressing each of said recorded one or more voice messages comprises one of a recipient address and an arbitrary address;

transmitting said recorded one or more voice messages, said one of said recipient address and said arbitrary address, and a client identifier associated with said client component to a messaging server via a communication network;

resolving, at said messaging server, a recipient delivery address based on said arbitrary address for delivering each of said recorded one or more voice messages to said recipient, wherein said resolved recipient delivery address is one of said recipient address, a predefined delivery address of said recipient, a predefined electronic mail address of said recipient, a default recipient address, and a predefined identification number of said recipient, wherein said computer program codes for resolving said recipient delivery address based on said arbitrary address perform one or more of:
 matching said arbitrary address with said predefined delivery address of said recipient;
 matching said arbitrary address with one of said predefined electronic mail address and said predefined identification number of said recipient; and
 matching said arbitrary address with said default recipient address;

transmitting, from said messaging server, a delivery message comprising one or more of said recorded one or more voice messages to said resolved recipient delivery address.

19. A computer implemented method for sending voice messages from a sender to a recipient, comprising:

providing a client component, said client component rendering a graphical user interface;

providing a messaging server that enables interaction between said sender and said recipient for said exchanging of said voice messages;

receiving inputs from said sender for recording one or more of said voice messages on said client component;

receiving inputs from said sender via said graphical user interface for addressing said recorded one or more voice messages on said client component, wherein said inputs received for addressing each of said recorded one or more voice messages comprises one of a recipient address and an arbitrary address;

transmitting said recorded one or more voice messages, said one of said recipient address and said arbitrary address, and a client identifier associated with said client component to said messaging server via a communication network;

resolving, at said messaging server, a recipient delivery address based on said arbitrary address for delivering each of said recorded one or more voice messages to said recipient; and transmitting, from said messaging server, a delivery message comprising one or more of said recorded one or more voice messages to said resolved recipient delivery address, wherein said delivery message further comprises a web address, optional explanatory text, and a session identifier, wherein said web address provides a link that allows said recipient to download said client component from said messaging server, and wherein said session identifier allows continuity of said exchange of said voice messages between said sender and said recipient by routing said one or more response messages of said recipient to said sender.

20. A computer implemented method for sending voice messages from a sender to a recipient, comprising:

providing a client component, said client component rendering a graphical user interface;

providing a messaging server that enables interaction between said sender and said recipient for said exchanging of said voice messages;

receiving inputs from said sender for recording one or more of said voice messages on said client component;

receiving inputs from said sender via said graphical user interface for addressing said recorded one or more voice messages on said client component, wherein said inputs received for addressing each of said recorded one or more voice messages comprises one of a recipient address and an arbitrary address;

transmitting said recorded one or more voice messages, said one of said recipient address and said arbitrary address, and a client identifier associated with said client component to said messaging server via a communication network;

resolving, at said messaging server, a recipient delivery address based on said arbitrary address for delivering each of said recorded one or more voice messages to said recipient, wherein said resolving of said recipient delivery address based on said arbitrary address by said messaging server comprises one or more of:

matching said arbitrary address with a predefined delivery address of said recipient;

matching said arbitrary address with one of a predefined electronic mail address and a predefined identification number of said recipient; and matching said arbitrary address with a default recipient address;

transmitting, from said messaging server, a delivery message comprising one or more of said recorded one or more voice messages to said resolved recipient delivery address.

* * * * *